United States Patent
Li et al.

(10) Patent No.: US 12,198,390 B2
(45) Date of Patent: Jan. 14, 2025

(54) THREE-DIMENSIONAL DATA POINT ENCODING AND DECODING METHOD AND DEVICE

(71) Applicant: SZ DJI TECHNOLOGY CO., LTD., Shenzhen (CN)

(72) Inventors: Pu Li, Shenzhen (CN); Fu Zhang, Shenzhen (CN); Xiaozhen Zheng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 594 days.

(21) Appl. No.: 17/371,999

(22) Filed: Jul. 9, 2021

(65) Prior Publication Data
US 2021/0335015 A1    Oct. 28, 2021

Related U.S. Application Data

(63) Continuation of application No. PCT/CN2019/071494, filed on Jan. 11, 2019.

(51) Int. Cl.
*G06T 9/00* (2006.01)
*G06T 7/62* (2017.01)
*G06T 9/40* (2006.01)

(52) U.S. Cl.
CPC .............. *G06T 9/001* (2013.01); *G06T 7/62* (2017.01); *G06T 9/40* (2013.01)

(58) Field of Classification Search
CPC .............. G06T 9/001; G06T 7/62; G06T 9/40
See application file for complete search history.

(56) References Cited

U.S. PATENT DOCUMENTS

| | | | |
|---|---|---|---|
| 2005/0216238 A1* | 9/2005 | Teshima | G06T 17/00 703/2 |
| 2010/0207941 A1* | 8/2010 | Lee | G06T 9/40 382/233 |

(Continued)

FOREIGN PATENT DOCUMENTS

| | | |
|---|---|---|
| CN | 1681330 A | 10/2005 |
| CN | 104243958 A | 12/2014 |

(Continued)

OTHER PUBLICATIONS

The World Intellectual Property Organization (WIPO) International Search Report for PCT/CN2019/071494 Oct. 11, 2019 6 pages (translation included).

*Primary Examiner* — Vu Le
*Assistant Examiner* — Winta Gebreslassie
(74) *Attorney, Agent, or Firm* — ANOVA LAW GROUP, PLLC

(57) ABSTRACT

A three-dimensional data point encoding method, decoding method, and encoding device. The encoding method includes: determining maximum values of side lengths of a cuboid of three-dimensional data points to be encoded in three directions according to position coordinates of the three-dimensional data points to be encoded; performing at least one octree partition process on the cuboid, to obtain a plurality of first-type sub-blocks; performing at least one quadtree partition process or binary tree partition process on at least one first-type sub-block of the plurality of first-type sub-blocks; and encoding the three-dimensional data points to be encoded according to partition results of the cuboid.

21 Claims, 11 Drawing Sheets

(56) References Cited

U.S. PATENT DOCUMENTS

| | | | |
|---|---|---|---|
| 2011/0091118 A1 | 4/2011 | Ahn et al. | |
| 2019/0087979 A1* | 3/2019 | Mammou | H04N 19/597 |
| 2021/0306643 A1* | 9/2021 | Zhao | H04N 19/159 |
| 2023/0164354 A1* | 5/2023 | Iguchi | G06T 9/40 |
| | | | 375/240.12 |
| 2023/0196626 A1* | 6/2023 | Wang | G06T 9/004 |
| | | | 382/238 |
| 2023/0386092 A1* | 11/2023 | Sugio | G06T 9/40 |

FOREIGN PATENT DOCUMENTS

| | | |
|---|---|---|
| CN | 105808672 A | 7/2016 |
| CN | 108965873 A | 12/2018 |
| EP | 1574996 A2 | 9/2005 |

\* cited by examiner

THREE-DIMENSIONAL DATA POINT ENCODING AND DECODING METHOD AND DEVICE

CROSS-REFERENCE TO RELATED APPLICATION

This application is a continuation of International Application No. PCT/CN2019/071494, filed Jan. 11, 2019, the entire content of which is incorporated herein by reference.

TECHNICAL FIELD

The present disclosure relates to the field of image processing technologies and, more particularly, to a three-dimensional data point encoding and decoding method and devices.

BACKGROUND

A point cloud is a form of expression of a three-dimensional object or scene. The point cloud is composed of a set of discrete three-dimensional data points that are randomly distributed in space and express spatial structure and surface properties of the three-dimensional object or scene. To accurately reflect information in the space, the number of the discrete three-dimensional data points required is huge. To reduce the storage space occupied by the three-dimensional data points and bandwidth occupied during transmission, the three-dimensional data points need to be encoded and compressed.

In existing technologies, position coordinates of each three-dimensional data point are quantified according to difference between the maximum and minimum values of the position coordinates of the three-dimensional data points on the three axes, and the quantification accuracy determined according to the input parameters. Correspondingly, the input position coordinates of the three-dimensional data points are converted into integer coordinates greater than or equal to zero. The maximum value of the maximum values of the position coordinates in the three directions is selected, and a side length of a cube when octree partition is initialized is determined according to the selected maximum value. The side length is an integer power of 2 and is greater than or equal to the selected maximum value and also closest to the selected maximum value. After initializing the side length of the cube in the octree partition process, octree partition coding is performed. The partition of each layer of the octree uses the position coordinates of the center point of the current block for sub-block partition, and the current block is partitioned into eight small sub-blocks through the center point. After the sub-block partition is performed, it is determined whether there are three-dimensional data points in each sub-block, and the sub-blocks with three-dimensional data points will be further partitioned until the sub-blocks are partitioned to a minimum, that is, the side length of the sub-blocks is 1. The three-dimensional data points are encoded according to the partition result of the cube.

The encoding efficiency of the existing encoding methods is not good.

SUMMARY

In accordance with the disclosure, there is provided a three-dimensional data point encoding method. The method includes: determining maximum values of side lengths of a cuboid of three-dimensional data points to be encoded in three directions according to position coordinates of the three-dimensional data points to be encoded; performing at least one octree partition process on the cuboid, to obtain a plurality of first-type sub-blocks; performing at least one quadtree partition process and/or at least one binary tree partition process on at least one first-type sub-block of the plurality of first-type sub-blocks; and encoding the three-dimensional data points to be encoded according to partition results of the cuboid.

In accordance with the disclosure, there is also provided a three-dimensional data point decoding method. The method includes: decoding code stream of the three-dimensional data points to be decoded; constructing a hexahedron according to the decoded code stream and performing at least one octree partition process on the hexahedron to obtain a plurality of first-type sub-blocks; performing at least one quadtree partition process and/or at least one binary tree partition process on at least one first-type sub-blocks of the plurality of first-type sub-blocks; and obtaining position coordinates of the three-dimensional data points to be decoded according to the positions of the sub-blocks obtained by partition.

In accordance with the disclosure, there is also provided a three-dimensional data point encoding device. The device includes a processor and a memory. The processor is configured to: determine maximum values of side lengths in three directions of a cuboid of three-dimensional data points to be encoded, according to position coordinates of the three-dimensional data points to be encoded; perform at least one octree partition process on the cuboid to obtain a plurality of first-type sub-blocks; perform at least one quadtree partition process and/or at least one binary tree partition process on at one first-type sub-blocks of the plurality of first-type sub-blocks; and encode the three-dimensional data points to be encoded according to partition results of the cuboid. The memory is configured to store code stream obtained by encoding.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Figure 1:
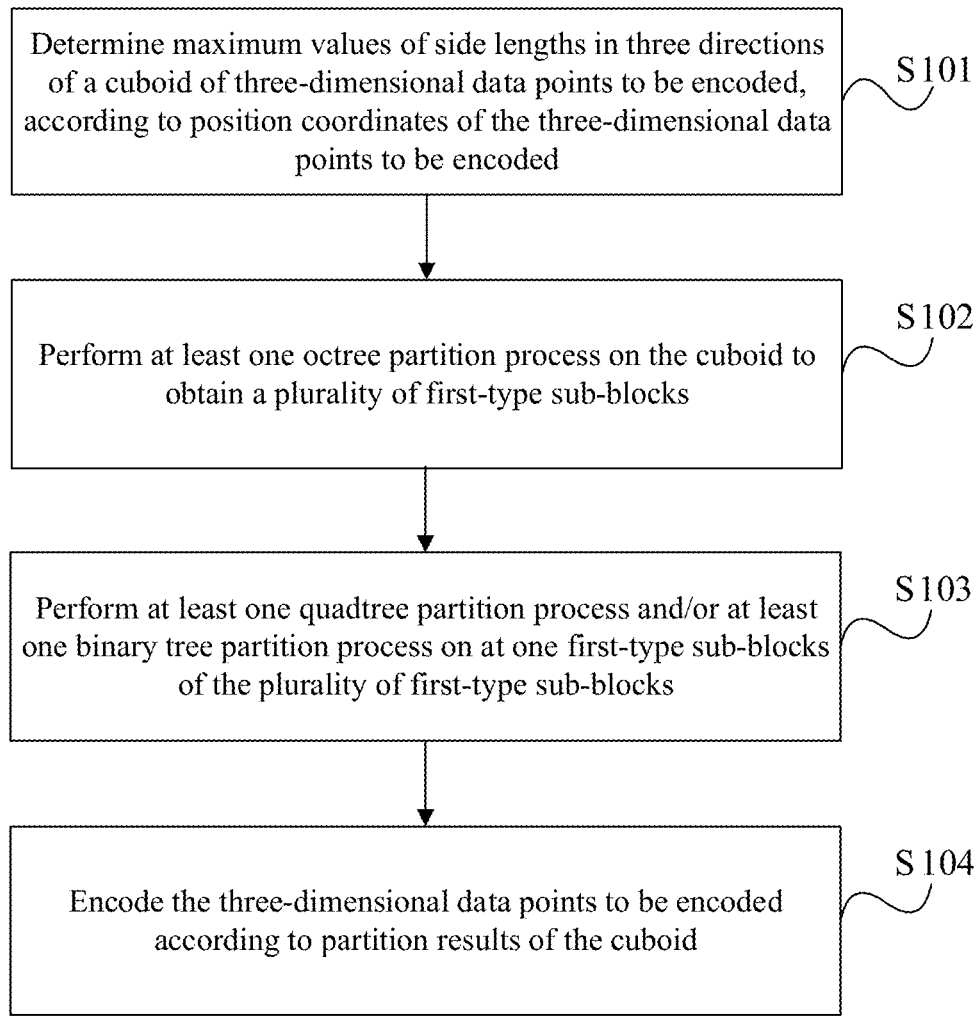
FIG. 1 is an exemplary three-dimensional data point encoding method consistent with various embodiments of the present disclosure.

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

It should be noted that when a component is referred to as being "fixed to" another component, it can be directly on the other component or a component between them may also exist. When a component is considered to be "connected" to another component, it can be directly connected to the other component or a component between them may also exist.

Unless otherwise defined, all technical and scientific terms used herein have the same meaning as commonly understood by those skilled in the technical field of the present disclosure. The terms used in the description of the present disclosure herein are only for the purpose of describing specific embodiments, and are not intended to limit the present disclosure. The term "and/or" as used herein includes any and all combinations of one or more related listed items.

In the following, some embodiments of the present disclosure will be described in detail with reference to the accompanying drawings. In the case of no conflict, the following embodiments and features in the embodiments can be combined with each other.

The embodiments of the present disclosure are mainly aimed at a scene when value ranges of position coordinates of some three-dimensional data points in a point cloud are different in three directions.

In the present disclosure, side lengths in the three directions of a rectangular parallelepiped constructed to partition the distribution of spatial three-dimensional data points may be different, and the specific side lengths may be determined by the maximum values of the three-dimensional data points in the three directions. Correspondingly, in the partition process, the number of partitions for the side lengths in the three directions to reach the minimum side length may be different. When one side length reaches the minimum side length, quadtree partition or binary tree partition may be used to partition until the side lengths in the three directions all reach the minimum. Therefore, the number of partitions may be reduced and encoding and decoding efficiency may be improved. The reduction in the number of partitions may reduce lengths of encoding streams accordingly, and the position coordinates of the three-dimensional data points may be more effectively compressed. When encoding, different bit lengths can also be used for encoding with respect to different partition methods. The lengths of the code streams can be further reduced, and the encoding efficiency and compression efficiency can be further improved.

In the embodiments of the present disclosure, the minimum side length in each direction refers to the side length in each direction of each sub-block obtained at the end of the partition. The minimum side length in each direction can be preset before encoding. The minimum side length in each direction may be the same or different.

In the embodiments of the present disclosure, for ease of description, the sub-blocks obtained by performing octree partition at any time are called the first-type sub-blocks, and the sub-blocks obtained by performing quad-tree partition at any one time is called the second-type sub-blocks. The sub-blocks obtained by dividing the binary tree at any one time are called the third-type sub-blocks.

The present disclosure provides a three-dimensional data point encoding method. As shown in FIG. 1, in one embodiment, the method includes S101 to S104.

In S101, according to position coordinates of three-dimensional data points to be encoded, maximum values of side lengths along three directions of a cuboid of the three-dimensional data points to be encoded are determined.

In one embodiment, the position coordinates of the three-dimensional data points to be encoded may be quantified and maximum values of the position coordinates of the three-dimensional data points in the three directions may be obtained according to the quantified position coordinates of the three-dimensional data points. According to the maximum values of the position coordinates of the three-dimensional data points in the three directions, the maximum values of the side lengths in the three directions of the cuboid of the three-dimensional data points to be encoded may be determined.

Optionally, in each direction, the value among the values greater than or equal to the integer power of 2 of the maximum value of the position coordinates of the three-dimensional data point that is closest to the maximum value may be obtained.

Optionally, after the position coordinates are quantified, the method may further include: performing an operation of removing duplicate position coordinates.

Optionally, the cuboid can cover all three-dimensional data points or most of the three-dimensional data points of the point cloud.

Optionally, the maximum values of the position coordinates of the three-dimensional data points to be coded in the three directions may be encoded, and the maximum values in the three directions may be written into the information header. Or, a maximum value of the maximum values of the position coordinates of the three-dimensional data points to be coded in the three directions may be encoded, and the maximum value of the maximum values of the three directions may be written into the information header. Or, a minimum value of the maximum values of the position coordinates of the three-dimensional data points to be coded in the three directions may be encoded, and the minimum value of the maximum values of the three directions may be written into the information header. Constructing a cuboid or cube constructed by a decoding end to partition the distribution of spatial three-dimensional data points according to the value in the information header may be facilitated.

In S102, at least one octree partition process is performed on the cuboid, to obtain a plurality of first-type sub-blocks.

The at least one octree partition process is performed on the cuboid and eight sub-blocks are obtained after each octree partition process of the at least one octree partition process. Each partition process is to partition the sub-blocks containing the position coordinates of the three-dimensional data points obtained in the previous partition until the side lengths of the sub-blocks obtained in one or two directions reach the minimum side length.

Optionally, one octree partition process of the at least one octree partition process may be performed according to the coordinates of center points of the plurality of first-type sub-blocks obtained in the previous partition.

In one embodiment, one octree partition process may include: using a first plane that passes through the coordinates of the center points and is parallel to the xoy plane, a second plane that passes through the coordinates of the center points and is parallel to the xoz plane, and a third plane that passes through the coordinates of the center points and is parallel to the yoz plane, to partition the sub-blocks obtained in the previous partition into eight sub-blocks.

In another embodiment, in one octree partition process: assuming that the coordinates of the center point of one of the previous first-type sub-blocks are (xmid, ymid, zmid), the coordinate ranges corresponding to the eight sub-blocks obtained by the current octree partition process may be respectively: the coordinate range of the first sub-block is x≤xmid, Y≤ymid, z≤zmid, the coordinate value range of the second sub-block is x≤xmid, y≤ymid, z>zmid, and the coordinate value range of the third sub-block is x≤xmid, y>ymid, z≤zmid, the coordinate value range of the fourth sub-block is x≤xmid, y>ymid, z>zmid, the coordinate value range of the fifth sub-block is x>xmid, y≤ymid, z≤zmid, the coordinate value range of the sixth sub-block is x>xmid, y≤ymid, z>zmid, the coordinate value range of the seventh sub-block is x>xmid, y>ymid, z≤zmid, and the coordinate value range of the eighth sub-block is x>xmid, y>ymid, z>zmid.

In S103, at least one quad-tree partition process or binary tree partition is performed on at least one first-type sub-blocks of the plurality of first-type sub-blocks.

The side lengths in the three directions of the cuboid are different, and the partition methods are different correspondingly. It may include but be not limited to following possible cases.

In one possible case, the side lengths of the three directions of the cuboid may be all different. Therefore, after the octree partition is completed, quadtree partition and binary tree partition may be required.

In another possible case, the side lengths of two directions of the cuboid may be equal, and the same side lengths are greater than the side length of the other direction. Then after the octree partition is completed, only the quadtree partition may be required.

In another possible case, the side lengths of two directions of the cuboid are equal, and the same side length is less than the side length of the other direction. Then after the octree partition is completed, only the binary tree partition may be required before the end.

In S104, the three-dimensional data points are encoded according to the partition result of the cuboid.

In this embodiment, according to the position coordinates of the three-dimensional data points to be coded, the maximum values of the side lengths of the cuboid in the three directions of the three-dimensional data points to be coded may be determined, and then the cuboid may be partitioned by using the at least one octree partition process to obtain the plurality of first-type sub-blocks. The at least one quad-tree partition process and/or binary-tree partition process may be performed on at least one first-type sub-block of the plurality of first-type sub-blocks, and the three-dimensional data points to be encoded may be encoded according to the result of the cuboid partition. Since the side lengths in the three directions of the cuboid constructed to partition the distribution of three-dimensional data points in the space may be different, the number of the partition processes necessary for the side lengths in the three directions to reach the minimum side length may be different during the partition. When one side length reaches the minimum side length, the quad-tree partition or the binary tree partition may be used for partition until the side lengths in the three directions all reach the minimum side length. The number of the partition processes may be reduced and the encoding and decoding efficiency may be improved.

Figure 2:
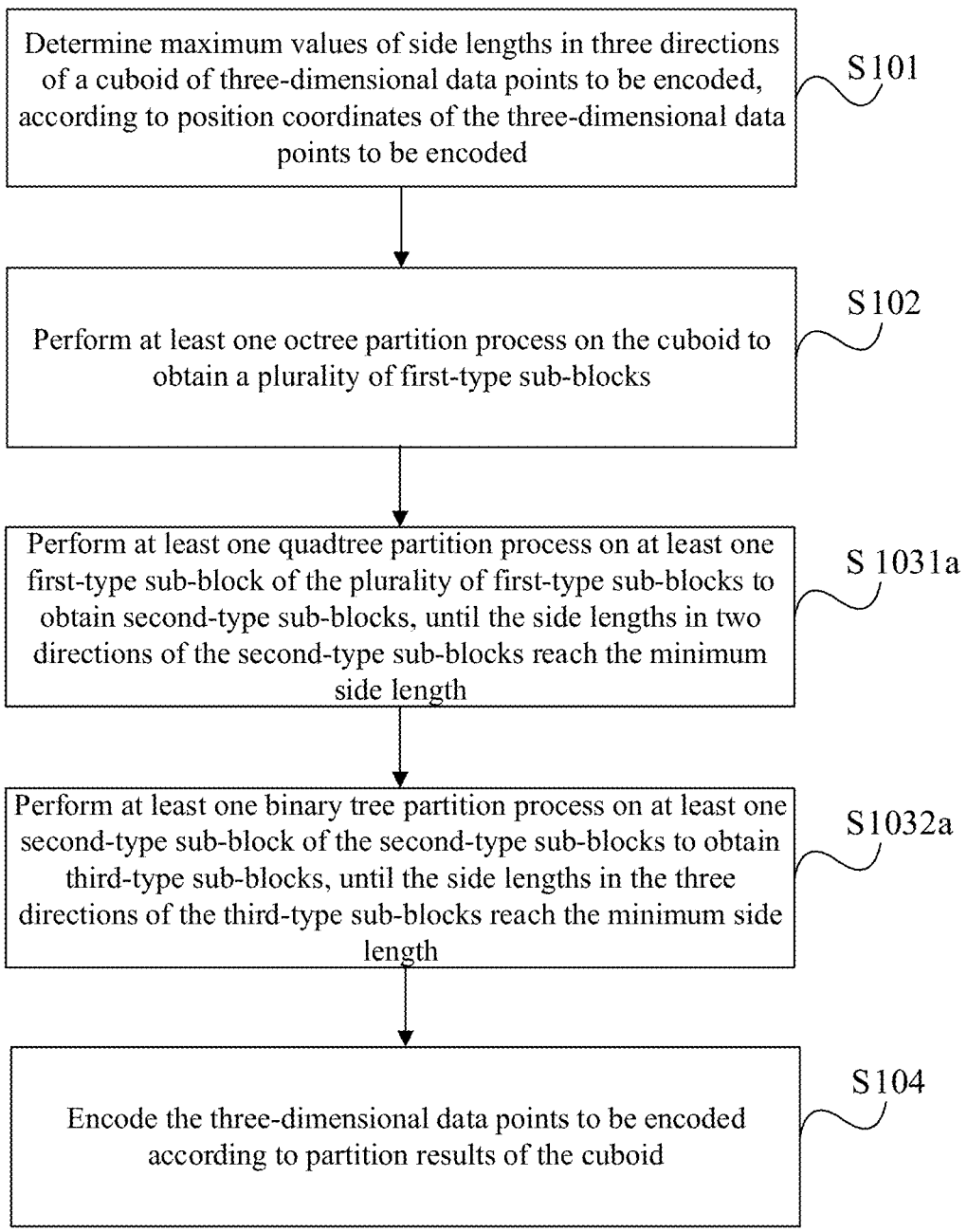
FIG. 2 is another exemplary three-dimensional data point encoding method consistent with various embodiments of the present disclosure.

FIG. 2 is another exemplary three-dimensional data point encoding method. Based on the embodiment in FIG. 1, FIG. 2 illustrates a possible implementation of S103 when the side lengths in the three directions of the cuboid are all different. As shown in FIG. 2, the implementation of S103 includes S1031a to S1032a.

In S1031a, at least one quadtree partition process is performed on at least one first-type sub-block of the plurality of first-type sub-blocks to obtain second-type sub-blocks, until the side lengths in two directions of the second-type sub-blocks reach the minimum side length.

In one embodiment, first-type target sub-bocks of the plurality of first-type sub-blocks may be determined. Optionally, the first-type target sub-blocks may be denoted as sub-blocks of the plurality of first-type sub-blocks whose side length in one direction reaches the minimum side length and contains three-dimensional data points. At least one quadtree partition process may be performed on the first-type target sub-blocks.

Specifically, at least one quadtree partition process may be performed on the first-type target sub-blocks and four second-type sub-blocks may be obtained after each quadtree partition process of the at least one quadtree partition process. Each quadtree partition process of the at least one quadtree partition process may be a partition on the second sub-blocks containing the position coordinates of the three-dimensional data points obtained in a previous partition process, until the side lengths in both directions of the second-type sub-blocks obtained by the partition reach the minimum side length.

Optionally, the octree partition may be performed according to the coordinates of the center points of the first-type target sub-blocks obtained in the previous partition process.

In one implantation of one quadtree partition process: when the side length in the x direction reaches the minimum side length, the first plane that passes through the coordinates of the center point and is parallel to the xoy plane and the second plane that passes through the coordinates of the center point and is parallel to the xoz plane may be used to partition the sub-blocks obtained in the previous partition process into four second-type sub-blocks; when the side length in the y direction reaches the minimum side length, the first plane that passes through the coordinates of the center point and is parallel to the xoy plane and the third plane that passes through the coordinates of the center point and is parallel to the yoz plane may be used to partition the sub-blocks obtained in the previous partition process into four second-type sub-blocks; and when the side length in the z direction reaches the minimum side length, the second plane that passes through the coordinates of the center point and is parallel to the xoz plane and the third plane that passes through the coordinates of the center point and is parallel to the yoz plane may be used to partition the sub-blocks obtained in the previous partition process into four second-type sub-blocks.

In another implantation of one quadtree partition process: when the side length in the x direction reaches the minimum side length and the coordinates of the center point of the first-type target sub-blocks are (ymid, zmid), the coordinate range of the first second-type of sub-block is y≤ymid, z≤zmid, the coordinate value range of the second second-type sub-block is: y≤ymid, z>zmid, the coordinate value range of the third second-type sub-block is: y>ymid, z≤zmid, and the coordinate value range of the fourth second-type sub-block is: y>ymid, z>zmid; when the side length in the y direction reaches the minimum side length and the coordinates of the center point of the first-type target sub-blocks are (xmid, zmid), the coordinate range of the first second-type of sub-block is x≤xmid, z≤zmid, the coordinate value range of the second second-type sub-block is: x≤xmid, z>zmid, the coordinate value range of the third second-type sub-block is x>xmid, z≤zmid, and the coordinate value range of the fourth second-type sub-block is: x>xmid, z>zmid; and when the side length in the z direction reaches the minimum side length and the coordinates of the center point of the first-type target sub-blocks are (xmid, ymid), the coordinate range of the first second-type of sub-block is x≤xmid, y≤ymid, the coordinate value range of the second second-type sub-block is: x≤xmid, y>ymid, the coordinate value range of the third second-type sub-block is: x>xmid, y≤ymid, and the coordinate value range of the fourth second-type sub-block is: x>xmid, y>ymid.

In S1032a, at least one binary tree partition process is performed on at least one second-type sub-block of the second-type sub-blocks to obtain third-type sub-blocks, until the side lengths in the three directions of the third-type sub-blocks reach the minimum side length.

In one embodiment, a second-type target sub-bock of the second-type sub-blocks may be determined. Optionally, the second-type target sub-block may be denoted as one sub-block of the second-type sub-blocks whose side lengths in two direction reaches the minimum side length and contains three-dimensional data points. At least one binary tree partition process may be performed on the second-type target sub-block.

Specifically, at least one binary tree partition process may be performed on the second-type target sub-block and second third-type sub-blocks may be obtained after each binary tree partition process of the at least one binary tree partition process. Each binary tree partition process of the at least one binary tree partition process may be a partition on the sub-blocks containing the position coordinates of the three-dimensional data points obtained in a previous partition process, until the side lengths in the three directions of the third-type sub-blocks reach the minimum side length.

In one implantation of one binary tree partition process: when the side lengths in the x direction and the y direction reach the minimum side length, the first plane that passes through the center point and is parallel to the xoy plane may be used to partition one sub-block obtained from the previous partition into two sub-blocks; when the side lengths in the x direction and the z direction reach the minimum side length, the second plane that passes through the center point and is parallel to the xoz plane may be used to partition one sub-block obtained from the previous partition into two sub-blocks; and when the side lengths in the z direction and the y direction reach the minimum side length, the third plane that passes through the center point and is parallel to the yoz plane may be used to partition one sub-block obtained from the previous partition into two sub-blocks.

In another implantation of one binary tree partition process: when the side lengths in the x direction and the y direction reach the minimum side length and the coordinates of the central point of the third-type sub-blocks are (zmid), the coordinate value range of the first third-type sub-block is z≤zmid and the coordinate value range of the second third-type sub-block is z>zmid; when the side lengths in the x direction and the z direction reach the minimum side length and the coordinates of the central point of the third-type sub-blocks are (ymid), the coordinate value range of the first third-type sub-block is y≤ymid and the coordinate value range of the second third-type sub-block is y>ymid; and when the side lengths in the y direction and the z direction reach the minimum side length and the coordinates of the central point of the third-type sub-blocks are (xmid), the coordinate value range of the first third-type sub-block is x≤xmid and the coordinate value range of the second third-type sub-block is x>xmid.

In the present embodiment, the maximum value of the side lengths in three directions of the cuboid of the three-dimensional data points to be encoded may be obtained according to the position coordinates of the three-dimensional data points to be encoded, and then at least one octree partition may be performed on the cuboid to obtain the plurality of first-type sub-blocks. At least one quadtree partition process may be performed on at least one first-type sub-blocks of the plurality of first-type sub-blocks, to obtain the second-type sub-blocks, until the side lengths in the two directions of the second-type sub-blocks reach the minimum side length. At least one binary tree partition process may be performed on at least one second-type sub-block to obtain the third-type sub-blocks until the side lengths in the three directions of the third-type sub-blocks reach the minimum side length. Subsequently, the three-dimensional data points to be encoded may be encoded according to the partition results of the cuboid. That is, when the side lengths of the cuboid in three directions are all different, a partition process mixing the octree, quadtree, and binary tree may be used to partition the cuboid that is constructed to partition the distribution of the three-dimensional data points. The number of partitions may be reduced and encoding and decoding efficiency may be improved. The reduction in the number of partitions may reduce lengths of encoding streams accordingly, and the position coordinates of the three-dimensional data points may be more effectively compressed. When encoding, different bit lengths can also be used for encoding with respect to different partition methods. The lengths of the code streams can be further reduced, and the encoding efficiency and compression efficiency can be further improved.

Figure 3:
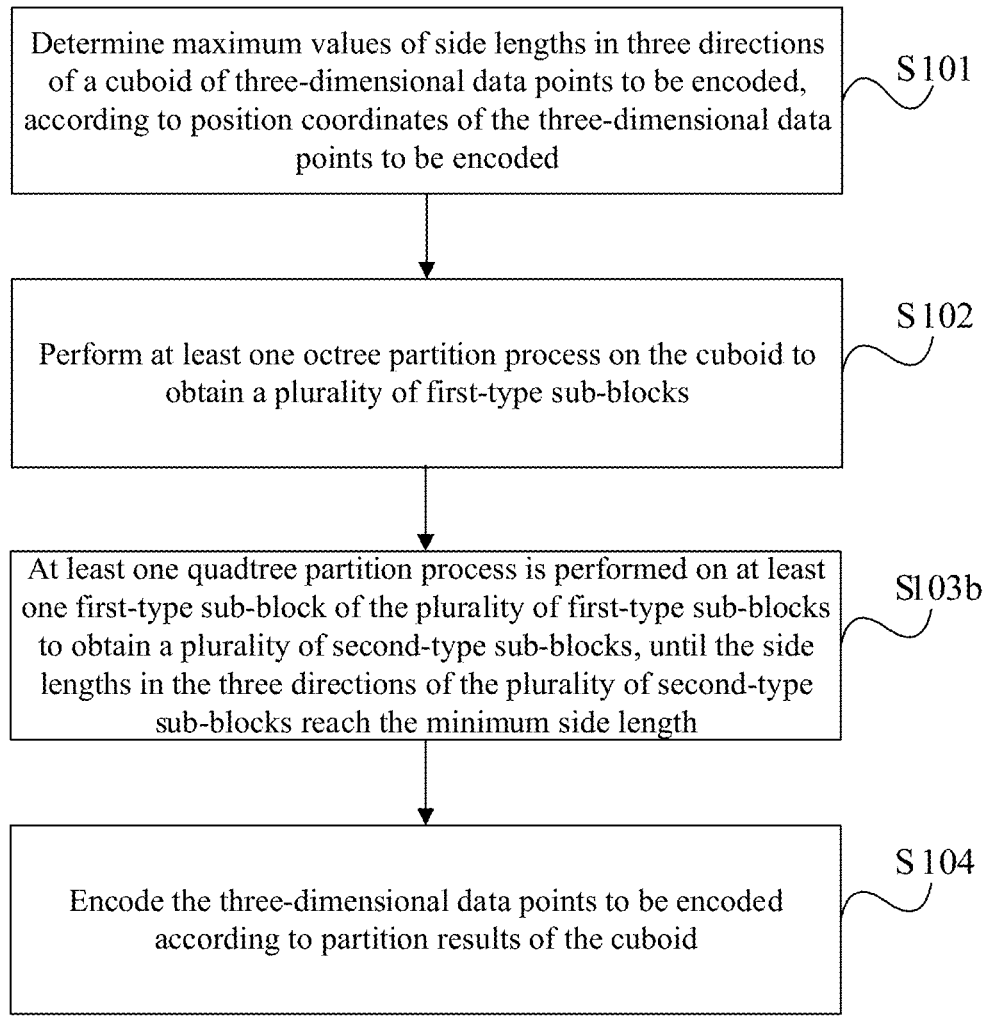
FIG. 3 is another exemplary three-dimensional data point encoding method consistent with various embodiments of the present disclosure.

FIG. 3 is another exemplary three-dimensional data point encoding method. Based on the embodiment in FIG. 1, FIG. 3 illustrates a possible implementation of S103 when the side lengths in two directions of the cuboid are same and larger than a side length in another direction. As shown in FIG. 3, the implementation of S103 includes S103b.

In S103b, at least one quadtree partition process is performed on at least one first-type sub-block of the plurality of first-type sub-blocks to obtain a plurality of second-type sub-blocks, until the side lengths in the three directions of the plurality of second-type sub-blocks reach the minimum side length.

In one embodiment, first-type target sub-bocks of the plurality of first-type sub-blocks may be determined. Optionally, the first-type target sub-blocks may be sub-blocks of the plurality of first-type sub-blocks whose side length in one direction reaches the minimum side length and contains three-dimensional data points. At least one quadtree partition process may be performed on the first-type target sub-blocks.

Specifically, at least one quadtree partition process may be performed on the first-type target sub-blocks and four second-type sub-blocks may be obtained after each quadtree partition process of the at least one quadtree partition process. Each quadtree partition process of the at least one quadtree partition process may be a partition on the plurality of second sub-blocks containing the position coordinates of the three-dimensional data points obtained in a previous partition process, until the side lengths in both directions of the second-type sub-blocks obtained by the partition reach the minimum side length.

Optionally, the octree partition may be performed according to the coordinates of the center points of the first-type target sub-blocks obtained in the previous partition process.

In one implantation of one quadtree partition process: when the side length in the x direction reaches the minimum side length, the first plane that passes through the coordinates of the center point and is parallel to the xoy plane and the second plane that passes through the coordinates of the center point and is parallel to the xoz plane may be used to partition the sub-blocks obtained in the previous partition process into four second-type sub-blocks; when the side length in the y direction reaches the minimum side length, the first plane that passes through the coordinates of the center point and is parallel to the xoy plane and the third plane that passes through the coordinates of the center point and is parallel to the yoz plane may be used to partition the sub-blocks obtained in the previous partition process into four second-type sub-blocks; and when the side length in the z direction reaches the minimum side length, the second plane that passes through the coordinates of the center point and is parallel to the xoz plane and the third plane that passes through the coordinates of the center point and is parallel to the yoz plane may be used to partition the sub-blocks obtained in the previous partition process into four second-type sub-blocks.

In another implantation of one quadtree partition process: when the side length in the x direction reaches the minimum side length and the coordinates of the center point of the first-type target sub-blocks are (ymid, zmid), the coordinate range of the first second-type of sub-block is y≤ymid, z≤zmid, the coordinate value range of the second second-type sub-block is: y≤ymid, z>zmid, the coordinate value range of the third second-type sub-block is: y>ymid, z≤zmid, and the coordinate value range of the fourth second-type sub-block is: y>ymid, z>zmid; when the side length in the y direction reaches the minimum side length and the coordinates of the center point of the first-type target sub-blocks are (xmid, zmid), the coordinate range of the first second-type of sub-block is x≤xmid, z≤zmid, the coordinate value range of the second second-type sub-block is: x≤xmid, z>zmid, the coordinate value range of the third second-type sub-block is x>xmid, z≤zmid, and the coordinate value range of the fourth second-type sub-block is: x>xmid, z>zmid; and when the side length in the z direction reaches the minimum side length and the coordinates of the center point of the first-type target sub-blocks are (xmid, ymid), the coordinate range of the first second-type of sub-block is x≤xmid, y≤ymid, the coordinate value range of the second second-type sub-block is: x≤xmid, y>ymid, the coordinate value range of the third second-type sub-block is: x>xmid, y≤ymid, and the coordinate value range of the fourth second-type sub-block is: x>xmid, y>ymid.

In the present embodiment, the maximum value of the side lengths in three directions of the cuboid of the three-dimensional data points to be encoded may be obtained according to the position coordinates of the three-dimensional data points to be encoded, and then at least one octree partition may be performed on the cuboid to obtain the plurality of first-type sub-blocks. At least one quadtree partition process may be performed on at least one first-type sub-blocks of the plurality of first-type sub-blocks, to obtain the plurality of second-type sub-blocks, until the side lengths in the three directions of the plurality of second-type sub-blocks reach the minimum side length. Subsequently, the three-dimensional data points to be encoded may be encoded according to the partition results of the cuboid. That is, when the side lengths of the cuboid in two directions are same and larger than the side length in another direction, a partition process mixing the octree and quadtree may be used to partition the cuboid that is constructed to partition the distribution of the three-dimensional data points. The number of partitions may be reduced and encoding and decoding efficiency may be improved. The reduction in the number of partitions may reduce lengths of encoding streams accordingly, and the position coordinates of the three-dimensional data points may be more effectively compressed. When encoding, different bit lengths can also be used for encoding with respect to different partition methods. The lengths of the code streams can be further reduced, and the encoding efficiency and compression efficiency can be further improved.

Figure 4:
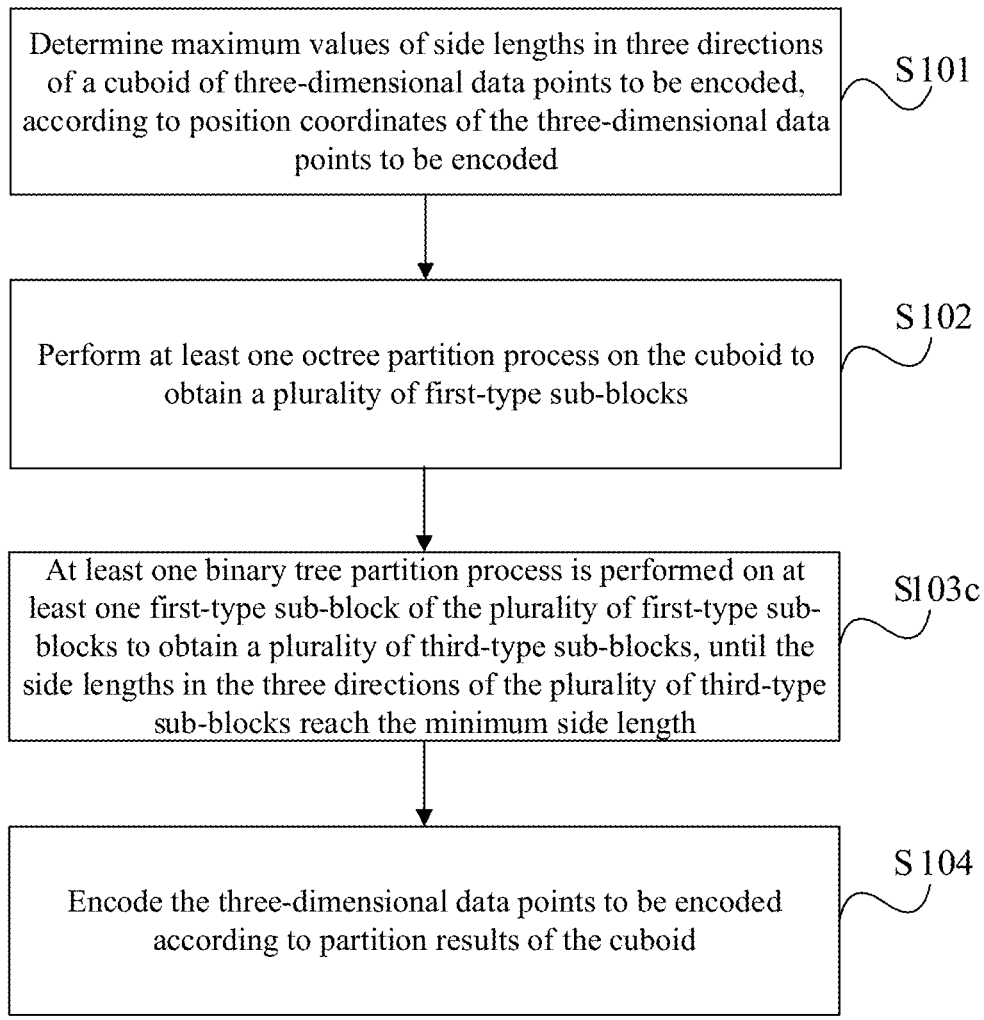
FIG. 4 is another exemplary three-dimensional data point encoding method consistent with various embodiments of the present disclosure.

FIG. 4 is another exemplary three-dimensional data point encoding method. Based on the embodiment in FIG. 1, FIG. 4 illustrates a possible implementation of S103 when the side lengths in two directions of the cuboid are same and smaller than a side length in another direction. As shown in FIG. 4, the implementation of S103 includes S103c.

In S103c, at least one binary tree partition process is performed on at least one first-type sub-block of the plurality of first-type sub-blocks to obtain a plurality of third-type sub-blocks, until the side lengths in the three directions of the plurality of third-type sub-blocks reach the minimum side length.

In one embodiment, first-type target sub-bocks of the plurality of first-type sub-blocks may be determined. Optionally, the first-type target sub-blocks may be sub-blocks of the plurality of first-type sub-blocks whose side length in one direction reaches the minimum side length and contains three-dimensional data points. At least one binary tree partition process may be performed on the first-type target sub-blocks.

Specifically, at least one binary tree partition process may be performed on the first-type target sub-blocks and two second-type sub-blocks may be obtained after each binary tree partition process of the at least one binary tree partition process. Each binary tree partition process of the at least one binary tree partition process may be a partition on the plurality of third sub-blocks containing the position coordinates of the three-dimensional data points obtained in a previous partition process, until the side lengths in the three directions of the plurality of third-type sub-blocks obtained by the partition reach the minimum side length.

In one implantation of one binary tree partition process: when the side lengths in the x direction and the y direction reach the minimum side length, the first plane that passes through the center point and is parallel to the xoy plane may be used to partition one sub-block obtained from the previous partition into two sub-blocks; when the side lengths in the x direction and the z direction reach the minimum side length, the second plane that passes through the center point and is parallel to the xoz plane may be used to partition one sub-block obtained from the previous partition into two sub-blocks; and when the side lengths in the z direction and the y direction reach the minimum side length, the third plane that passes through the center point and is parallel to the yoz plane may be used to partition one sub-block obtained from the previous partition into two sub-blocks.

In another implantation of one binary tree partition process: when the side lengths in the x direction and the y direction reach the minimum side length and the coordinates of the central point of the third-type sub-blocks are (zmid), the coordinate value range of the first third-type sub-block is z≤zmid and the coordinate value range of the second third-type sub-block is z>zmid; when the side lengths in the x direction and the z direction reach the minimum side length and the coordinates of the central point of the third-type sub-blocks are (ymid), the coordinate value range of the first third-type sub-block is y≤ymid and the coordinate value range of the second third-type sub-block is y>ymid; and when the side lengths in the y direction and the z direction reach the minimum side length and the coordinates of the central point of the third-type sub-blocks are (xmid), the coordinate value range of the first third-type sub-block is x≤xmid and the coordinate value range of the second third-type sub-block is x>xmid.

In the present embodiment, the maximum value of the side lengths in the three directions of the cuboid of the three-dimensional data points to be encoded may be obtained according to the position coordinates of the three-dimensional data points to be encoded, and then at least one octree partition may be performed on the cuboid to obtain the plurality of first-type sub-blocks. At least one binary partition process may be performed on at least one first-type sub-blocks of the plurality of first-type sub-blocks, to obtain the plurality of third-type sub-blocks, until the side lengths in the three directions of the plurality of third-type sub-blocks reach the minimum side length. Subsequently, the three-dimensional data points to be encoded may be encoded according to the partition results of the cuboid. That is, when the side lengths in two directions of the cuboid are same and smaller than a side length in another direction, a partition process mixing the octree and binary tree may be used to partition the cuboid that is constructed to partition the distribution of the three-dimensional data points. The number of partitions may be reduced and encoding and decoding efficiency may be improved. The reduction in the number of partitions may reduce lengths of encoding streams accordingly, and the position coordinates of the three-dimensional data points may be more effectively compressed. When encoding, different bit lengths can also be used for encoding with respect to different partition methods. The lengths of the code streams can be further reduced, and the encoding efficiency and compression efficiency can be further improved.

Figure 5:
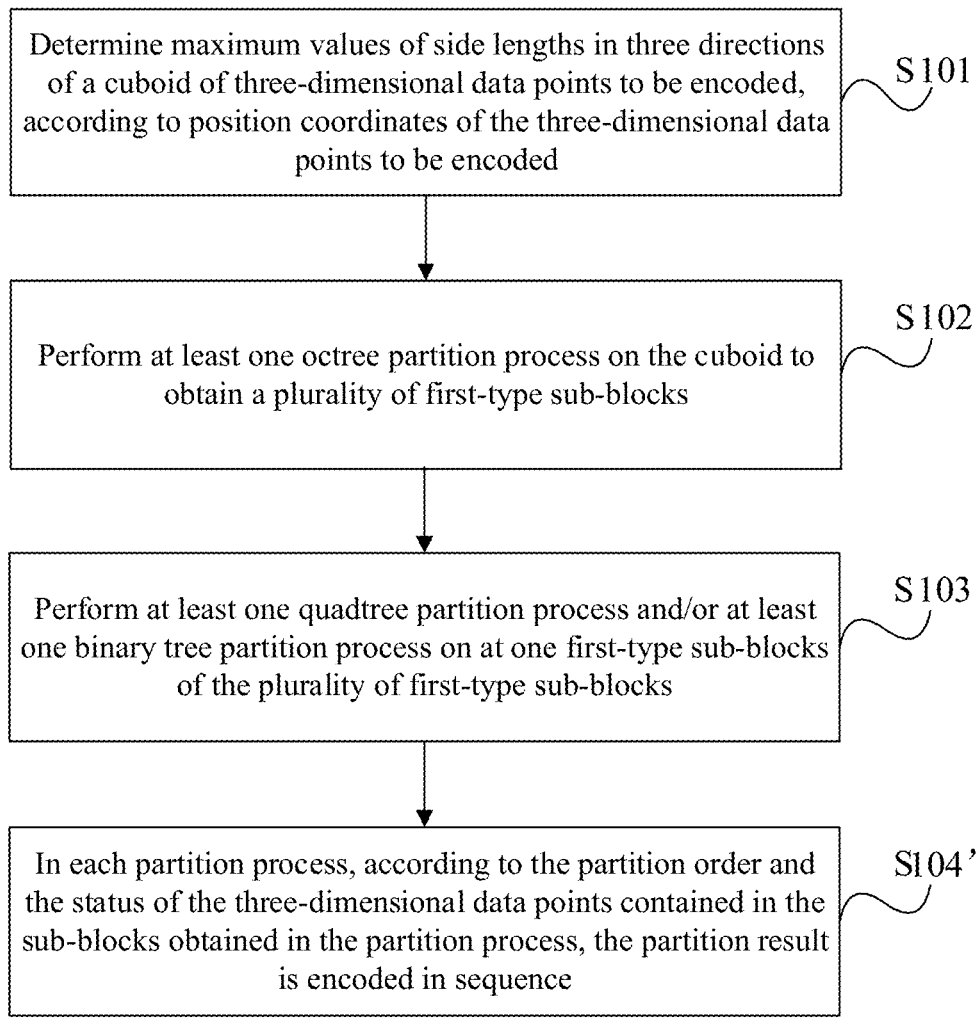
FIG. 5 is another exemplary three-dimensional data point encoding method consistent with various embodiments of the present disclosure.

FIG. 5 is another exemplary three-dimensional data point encoding method. Based on the embodiments in FIG. 1 to FIG. 4, FIG. 5 illustrates a possible implementation of S104. As shown in FIG. 4, the implementation of S104 includes S104'.

In S104', in each partition process, according to the partition order and the status of the three-dimensional data points contained in the sub-blocks obtained in the partition process, the partition result is encoded in sequence.

In one embodiment, in each partition process, according to the status of the three-dimensional data points contained in the sub-blocks obtained in the partition process, a code stream corresponding to the current partition process may be obtained, and then the code stream corresponding to the current partition process may be encoded according to the partition order.

In one embodiment, in each partition process, according to the status of the three-dimensional data points contained in the sub-blocks obtained in the partition process, the code stream corresponding to the current partition process may be obtained by: according to the status of the three-dimensional data points contained in the sub-blocks obtained in the partition process, obtaining a bitstream corresponding to each sub-block where each sub-block corresponds to one bit and bit values of the sub-blocks including the three-dimensional data points is different from bit values of the sub-blocks not including the three-dimensional data points; and generating the code stream corresponding to the current partition process according to the bit values corresponding to the sub-blocks. In each partition process, the bit values corresponding to the sub-blocks may be obtained, and the code stream corresponding to the current partition process may be obtained according to the bit values corresponding to the sub-blocks.

The number of bits of the code stream corresponding to each partition can be fixed to 8 bits, or can be determined according to the number of partitioned sub-blocks. For example, each octree partition may obtain eight sub-blocks, and the code stream corresponding to each octree partition may be identified by 8 bits subsequently. Each quadtree partition may obtain four sub-blocks, and the code stream corresponding to each quadtree partition may be identified by 4 bits. Each binary tree partition may obtain two sub-blocks, and the code stream corresponding to each binary tree partition may be identified by 2 bits.

In one embodiment, when the code stream corresponding to each partition is identified by 8 bits constantly, in each partition process, according to the bit values corresponding to the sub-blocks, the code stream corresponding to the current partition process may be obtained by:

when the octree partition is performed, determining the bit value of the 8 bits according to the three-dimensional data points contained in the eight sub-blocks obtained by the partition; when the quadtree partition is performed, determining the bit value of 4 bits among the 8 bits according to the three-dimensional data points contained in the four sub-blocks obtained by the partition, and determining the bit value of remaining 4 bits to be same as the bit values of the sub-block that does not contain the three-dimensional data point; when the binary tree partition is performed, determining the bit value of 2 bits among the 8 bits according to the three-dimensional data points contained in the two sub-blocks obtained by the partition, and determining the bit value of remaining 6 bits to be same as the bit values of the sub-block that does not contain the three-dimensional data point.

In another embodiment, when the number of bits in the code stream corresponding to each partition is determined according to the number of the sub-blocks obtained in the partition, in each partition process, according to the bit values corresponding to the sub-blocks, the code stream corresponding to the current partition process may be obtained by: when the octree partition is performed, determining the number of bits in the code stream corresponding to the partition to be 8, and determining the bit values of the 8 bits according to the status of the three-dimensional data points contained in the eight sub-blocks obtained by the partition; when the quadtree partition is performed, determining the number of bits in the code stream corresponding to the partition to be 4, and determining the bit value of the 4 bits according to the status of the three-dimensional data points contained in the four sub-blocks obtained by the partition; and when the binary tree partition is performed, determining the number of bits in the code stream corresponding to the partition to be 2, and determining the bit value of the 2 bits according to the three-dimensional data points contained in the two sub-blocks obtained by the partition.

In one embodiment, the bit value corresponding to a sub-block containing the three-dimensional data points may be set as 1, and the bit value corresponding to a sub-block that does not contain the three-dimensional data points may be set as 0. In another embodiment, the bit value corresponding to a sub-block containing the three-dimensional data points may be set as 0, and the bit value corresponding to a sub-block that does not contain the three-dimensional data points may be set as 1.

In one embodiment, optionally, when the side lengths in one direction or in two directions in the sub-blocks obtained in the partition reach the minimum side length, a first identifier may be encoded. The first identifier may be used to indicate a change of the partition mode where the partition mode includes the octree partition, the quadtree partition, or the binary tree partition, such that the decoding end may change the partition mode according to the first identifier.

When the side length in one direction of the sub-blocks obtained by the octree partition reaches the minimum side length or the side lengths in two directions of the sub-blocks obtained by the octree partition reach the minimum side length at the same time, the first identifier may have 8 bits, and the bit values of the 8 bits may be consistent with the bit values corresponding to the sub-blocks that do not contain three-dimensional data points. For example, when the bit value corresponding to the sub-block containing the three-dimensional point cloud data point is 1 and the bit value corresponding to the sub-block not containing the three-dimensional point cloud data point is 0 the first identifier is 00000000. For another example, when the bit value corresponding to the sub-block containing the three-dimensional point cloud data point is 0, and the bit value corresponding to the sub-block not containing the three-dimensional point cloud data point is 1, the first identifier is 11111111.

When the side lengths in two directions of the sub-blocks obtained by the quadtree partition reach the minimum side length, the first identifier may include 4 bits, and the bit values of the 4 bits may be consistent with the bit value corresponding to the sub-blocks that do not contain the three-dimensional data points. For example, when the bit value corresponding to the sub-block containing the three-dimensional point cloud data point is 1 and the bit value corresponding to the sub-block not containing the three-dimensional point cloud data point is 0 the first identifier is 0000. For another example, when the bit value corresponding to the sub-block containing the three-dimensional point cloud data point is 0, and the bit value corresponding to the sub-block not containing the three-dimensional point cloud data point is 1, the first identifier is 1111.

In one example, when the side length in one direction reaches the minimum side length first, the first identifier may be 00000000, and then when the side length in one of other directions reaches the minimum side length, the first identifier may be 0000.

In another example, when the side lengths in two directions reach the minimum side length simultaneously, the first identifier may be 00000000.

In another embodiment, when the side length in one direction reaches the minimum side length first, the first identifier may be 00000000.

In one embodiment, after the first identifier is encoded, a second identifier may be encoded further. The second identifier may be used to indicate the directions where the side lengths reach the minimum side length or the directions where the side lengths do not reach the minimum side length. Optionally, the second identifier may include 3 bits or 2 bits. In this way, the decoding end can determine which side length has reached the minimum side length and which side length has not reached the minimum side length according to the second identifier, thereby determining the direction of quadtree partition or binary tree partition.

For example, in one embodiment, the side lengths in the three directions may reach the minimum side length sequentially. When the side length in one direction reaches the minimum side length first, the second identifier may include three bits and may be 000, 001 or 010. 000, 001, and 010 respectively may correspond to the side length in one direction, indicating that the side length in the corresponding direction reaches the minimum side length. When the side length in one of other directions reaches the minimum side length, the second identifier may include two bits, and may be 00 or 01. 00 and 01 may respectively correspond to the side length of one of the remaining two directions.

In another embodiment, the side length in one direction may reach the minimum side length first, and the side lengths in the remaining two directions may reach the minimum side length at the same time. When the side length in one direction reaches the minimum side length first, the second identifier may include three bits, and may be 000, 001 or 010. 000, 001, and 010 respectively may correspond to the side length in one direction, indicating that the side length in the corresponding direction reaches the minimum side length.

In another embodiment, the side lengths in two directions may reach the minimum side length first, and the side length in the remaining direction may reach the minimum side length last. When the side lengths in two directions reach the minimum side length first, the second identifier may include three bits, and may be 100, 101, or 110. 100, 101, and 110 respectively may correspond to the side length in one direction, indicating that the side length in the corresponding direction does not reach the minimum side length.

In another embodiment, three bits may be used to represent the three directions in order, for example, x, y, and z in turn. When the side length of a certain direction reaches the minimum side length, the bit position corresponding to the direction reaching the minimum side length may be set to 1, and the bit position that has not reached the minimum side length may be set to 0. For example, when the side length in the x direction reaches the minimum side length first, the second identifier may be set to 100; when the side length in the y direction first reaches the minimum side length, the second identifier may be set to 010; when the side length in the z direction first reaches the minimum side length, the second identifier may be set to 001; when both the x and y directions reach the minimum side length It is 110. When the side lengths in the x direction and the y direction both reach the minimum side length first, the second identifier may be set to 110; when the side lengths in the x direction and the z direction both reach the minimum side length first, the second identifier may be set to 101; when the side lengths in the y direction and the z direction both reach the minimum side length first, the second identifier may be set to 011. Or, when the side length of a certain direction reaches the minimum side length, the bit position corresponding to the direction reaching the minimum side length may be set to 0, and the bit position that has not reached the minimum side length may be set to 1. For example, when the side length in the x direction reaches the minimum side length first, the second identifier may be set to 011; when the side length in the y direction first reaches the minimum side length, the second identifier may be set to 101; when the side length in the z direction first reaches the minimum side length, the second identifier may be set to 110. When the side lengths in the x direction and the y direction both reach the minimum side length first, the second identifier may be set to 001; when the side lengths in the x direction and the z direction both reach the minimum side length first, the second identifier may be set to 010; when the side lengths in the y direction and the z direction both reach the minimum side length first, the second identifier may be set to 100. The correspondence between the three bits and the three directions is not limited in the embodiment of the present disclosure, and any adjustment can be made.

Optionally, in one embodiment, a third identifier may be encoded. The third identifier may be used to indicate that the partition is completed. For example, when the side length in the last direction reaches the minimum side length, two bits 00 may be encoded to indicate that the partition is completed. For another example, when the side lengths in two directions reach the minimum side length last, four bits 0000 and two bits 10 may be encoded or four bits 0000 and two bits 11 may be encoded. The present disclosure has no limit on this as long as the completed partition can be distinguished.

In one embodiment, optionally, the number of the three-dimensional data points contained in the sub-block that contains the three-dimensional data points may be encoded further.

For example, when the sub-block contains one three-dimensional data point, 0 may be encoded to represent. When the sub-block contains N three-dimensional data points, 1 may be encoded and then N−1 may be encoded to represent.

Figure 6:
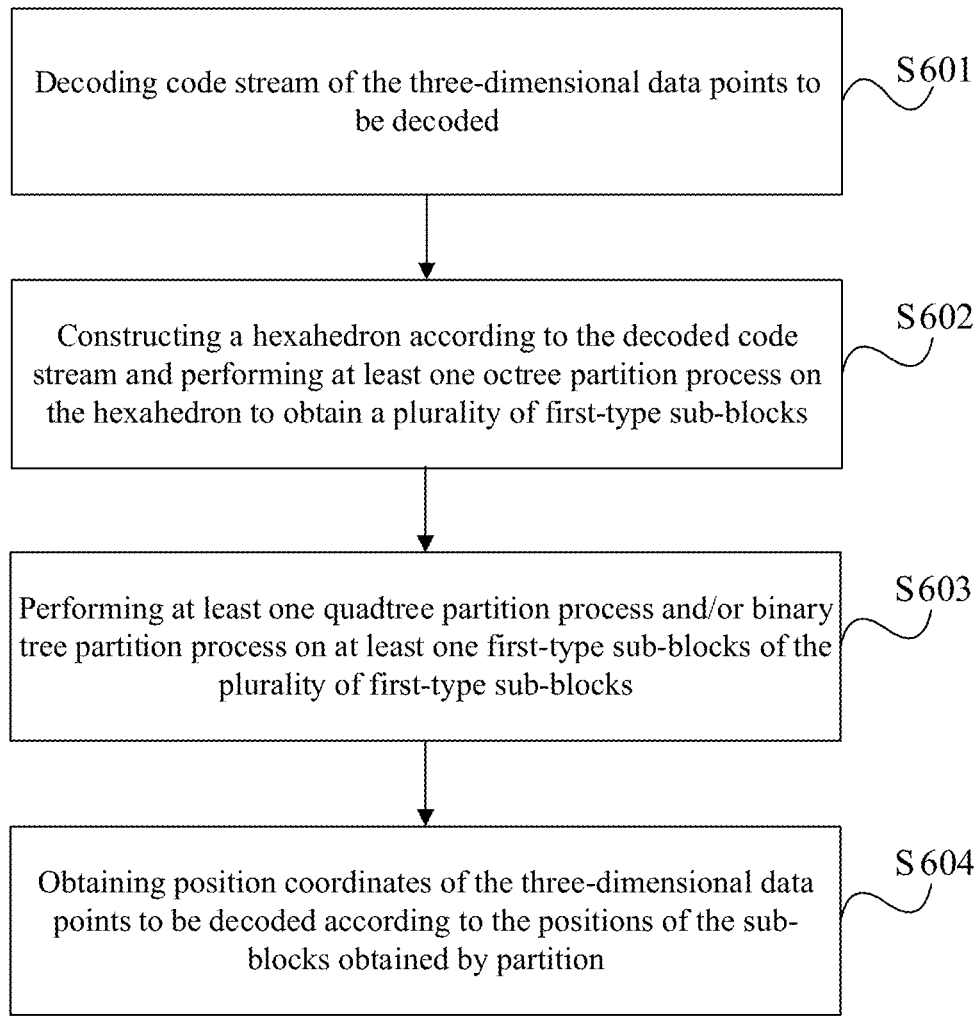
FIG. 6 is another exemplary three-dimensional data point encoding method embodiments of the present disclosure.

The present disclosure also provides a decoding method of three-dimensional data points. As illustrated in FIG. 6, in one embodiment, the method includes S601 to S604.

In S601, the decoding end decodes a code stream of the three-dimensional data points.

In S602, according to a code stream obtained by decoding, a hexahedron is constructed, and at least one octree partition process is performed on the constructed hexahedron to obtain a plurality of first-type sub-blocks.

The hexahedron may be a cube or a cuboid.

Optionally, decoding may be performed until the maximum values in three directions of the position coordinates of the three-dimensional data point to be decoded; and the cuboid may be constructed according to the maximum values in the three directions.

Optionally, decoding may be performed until the maximum value of the maximum values in the three directions of the position coordinates of the three-dimensional data points to be decoded; and the cube may be constructed according to the maximum value of the maximum values in the three directions.

Optionally, decoding may be performed until the minimum value of the maximum values in the three directions of the position coordinates of the three-dimensional data points to be decoded; and the cube may be constructed according to the minimum value of the maximum values in the three directions.

At least one octree partition process is performed on the constructed hexahedron to obtain a plurality of first-type sub-blocks. For the detailed description of the octree partition, please refer to the relevant description on the encoding end, which will not be repeated here.

In S603, at least one quadtree partition process and/or at least one binary tree partition process are performed on at least one first-type sub-blocks of the plurality of first-type sub-blocks.

In one embodiment, the hexahedron may be a cuboid, and correspondingly in one implementation:
when the side lengths of the three directions of the cuboid are all different, performing the at least one quadtree partition process and/or at least one binary tree partition process on at least one first-type sub-blocks of the plurality of first-type sub-blocks may include: performing at least one quadtree partition process on at least one first-type sub-block of the plurality of first-type sub-blocks to obtain second-type sub-blocks, until the side lengths in two directions of the second-type sub-blocks reach the minimum side length; and performing at least one binary tree partition process on at least one second-type sub-block of the second-type sub-blocks to obtain third-type sub-blocks, until the side lengths in the three directions of the third-type sub-blocks reach the minimum side length.

Specifically, first-type target sub-blocks may be determined according to the bit values corresponding to the plurality of first-type sub-blocks. Optionally, the bit values corresponding to the plurality of first-type sub-blocks may represent the three-dimensional data points contained in the plurality of first-type sub-blocks. At least one quadtree partition process may be performed on the first-type target sub-blocks. Second-type target sub-blocks may be determined according to the bit values corresponding to the second-type sub-blocks. Optionally, the bit values corresponding to the second-type sub-blocks may represent the three-dimensional data points contained in the second-type sub-blocks. At least one binary tree partition process may be performed on the second-type target sub-blocks.

For example, in one first-type sub-block of the last layer obtained by the octree partition, the bit value of 1 may mean that the first-type sub-block contains three-dimensional data points, then one first-type sub-block with the bit value of 1 may be determined as a first-type target sub-block, or a bit value of 0 indicates that the first-type sub-block contains three-dimensional data points and one first-type sub-block with a bit value of 0 may be determined as the first-type target sub-block.

Optionally, a first identifier may be used to indicate the change of the partition mode, and the decoding end may determine the change of the partition mode according to the first identifier. The partition mode may include octree partition, quadtree partition, and binary tree partition. In this implementation, the first identifier indicates a change from octree partition to quadtree partition, and a change from quadtree partition to binary tree partition.

Optionally, a second identifier may be used to indicate the directions where the side lengths reach the minimum side length or the directions the side lengths do not reach the minimum side length. The decoding end can determine which side length reaches the minimum side length according to the second identifier, along which direction the quadtree partition is performed, which side lengths of two directions reach the minimum side length, and along which two directions the binary tree partition is performed. In another embodiment, according to the second identifier, the decoding end may determine in which two directions the side lengths do not reach the minimum side length, along which two directions the quadtree partition is performed, in which direction the side length does not reach the minimum side length, and along which direction the binary tree partition is performed.

For the specific partition of the quadtree and the binary tree, please refer to the relevant description on the encoding end, which will not be repeated here.

In another embodiment, when the side lengths in two directions of the cuboid are equal and larger than the side length in another direction, performing the at least one quadtree partition process and/or at least one binary tree partition process on at least one first-type sub-blocks of the plurality of first-type sub-blocks to obtain the plurality of second-type sub-blocks, may include: performing at least one quadtree partition process on at least one first-type sub-block of the plurality of first-type sub-blocks to obtain second-type sub-blocks, until the side lengths in three directions of the second-type sub-blocks reach the minimum side length.

Optionally, a first identifier may be used to indicate the change of the partition mode, and the decoding end may determine the change of the partition mode according to the first identifier. The partition mode may include octree partition, quadtree partition, and binary tree partition. In this implementation, the first identifier indicates a change from octree partition to quadtree partition.

Optionally, a second identifier may be used to indicate the directions where the side lengths reach the minimum side length or the directions the side lengths do not reach the minimum side length. The decoding end can determine which side length reaches the minimum side length according to the second identifier, along which direction the quadtree partition is performed, or may determine in which two directions the side lengths do not reach the minimum side length, along which two directions the quadtree partition is performed.

For the specific the quadtree partition, please refer to the relevant description on the encoding end, which will not be repeated herein.

In another embodiment, when the side lengths in two directions of the cuboid are equal and smaller than the side length in another direction, at least one binary tree partition process may be performed on at least one first-type sub-block of the plurality of first-type sub-blocks to obtain a plurality of third-type sub-blocks, until the side lengths in three directions of the plurality of third-type sub-blocks reach the minimum side length.

Optionally, a first identifier may be used to indicate the change of the partition mode, and the decoding end may determine the change of the partition mode according to the first identifier. The partition mode may include octree partition, quadtree partition, and binary tree partition. In this implementation, the first identifier indicates a change from octree partition to binary tree partition.

Optionally, a second identifier may be used to indicate the directions where the side lengths reach the minimum side length or the directions the side lengths do not reach the minimum side length. The decoding end can determine in which two directions the side lengths reach the minimum side length simultaneously according to the second identifier and along which two directions the binary tree partition is performed, or may determine in which direction the side length does not reach the minimum side length and along which direction the binary tree partition is performed.

Optionally, a third identifier may be used to determine the end of the partition.

For the specific the binary tree partition, please refer to the relevant description on the encoding end, which will not be repeated here.

In one embodiment, the hexahedron may be a cubic, and which of the quadtree partition or the binary tree partition is to be performed may be determined according to the first identifier and the second identifier, and the third identifier may be used to determine the end of the partition.

For example, in the process of octree partition, when decoding to that the first identifier is eight bits of 00000000, it may mean that the partition mode is changed. And then when decoding to the second identifier is three bits of 000, 001 or 010, 000, 001 and 010 may correspond to the side length in one direction of the three directions respectively, and the side length of the direction corresponding to the second identifier may be determined to reach the minimum side length according to the second identifier, and the quadtree partition may be performed. In the process of quadtree partition, when decoding to that the first identifier is four bits of 0000, it may mean that the partition mode is changed. And then when decoding to that the second identifier is two bits of 00 or 01, 00 and 01 may respectively correspond to the side length of one of the remaining two directions, and the side length of one of the remaining two directions corresponding to the second identifier may be determined to reach the minimum side length according to the second identifier. The binary tree partition may be performed.

For another example, in the process of octree partition, when decoding to that the first identifier is eight bits of 00000000, it may mean that the partition mode is changed. And then the three bits of the second identifier may be decoded. The second identifier may be 000, 001 or 010. 000, 001 and 010 may correspond to the side length in one direction of the three directions respectively, and the side length of the direction corresponding to the second identifier may be determined to reach the minimum side length according to the second identifier, and the quadtree partition may be performed. In the process of quadtree partition, when the third identifier is decoded to be 000010 or 000011, the partition is determined to be completed.

For another embodiment, in the process of octree partition, when decoding to that the first identifier is eight bits of 00000000, it may mean that the partition mode is changed. And then the three bits of the second identifier may be decoded. The second identifier may be 100, 101 or 110. 100, 101 and 110 may correspond to the side length in one direction of the three directions respectively, and may indicate the side length of the direction corresponding to the second identifier does not reach the minimum side length according to the second identifier and the side lengths of two remaining directions reach the minimum side length simultaneously. Then the binary tree partition may be performed.

In the process of binary tree partition, when the third identifier is decoded to be 00, the partition is determined to be completed.

For another embodiment, in the process of octree partition, when decoding to that the first identifier is eight bits of 00000000, it may mean that the partition mode is changed. And then the three bits of the second identifier may be decoded. The second identifier may be 100, 010, 110, 001, 110, 101 or 011. According to a value of one direction corresponding to one bit position, whether the side length in this direction reaches the minimum side length may be determined. For example, the first bit, the second bit and the third bit may represent x, y, and z sequentially. The bit position that the side length in the corresponding direction reaches the minimum side length may be set to 1, and the bit position that does not reach the minimum side length may be set to 0. For example, 100 means the side length in the x direction reaches the minimum side length first; 010 indicates that the side length in the y direction reaches the minimum side length first; 001 indicates that the side length in the z direction reaches the minimum side length first; 110 indicates that both the side lengths in the x and y directions reach the minimum side length, 101 indicates that both the side lengths in the x and z directions reach the minimum side length, 011 means that both the side lengths in the y and z directions have reached the minimum side length. Or, the bit position that the side length in the corresponding direction reaches the minimum side length may be set to 0, and the bit position that the side length in the corresponding direction does not reach the minimum side length may be set to 1. For example: 011 means the side length in the x direction reaches the minimum side length first; 101 indicates that the side length in the y direction reaches the minimum side length first; 110 indicates that the side length in the z direction reaches the minimum side length first; 001 indicates that both the side lengths in the x and y directions reach the minimum side length, 010 indicates that both the side lengths in the x and z directions reach the minimum side length, 100 means that both the side lengths in the y and z directions have reached the minimum side length. The correspondence between the three bits and the three directions is not limited in the embodiment, and any adjustment can be made.

The third identifier may be used to determine the end of the partition. For example, after the binary tree partition, when decoding to two bits of 00, the partition may be determined to be completed. For another example, after the quadtree partition, when decoding to four bits of 0000 and two bits of 10, or decoding to four bits of 0000 and two bits of 11, the partition may be determined to be completed.

In S604, the position coordinates of the three-dimensional data points are obtained according to the positions of the sub-blocks obtained by partition.

In one embodiment, when the hexahedron constructed to partition the distribution of spatial three-dimensional data points is a cuboid which is constructed according to the maximum value in the three directions, inverse quantification of the decoded coordinate values which is inverse to the encoding end may be used to get the actual position coordinate values of all the three-dimensional data points.

In another embodiment, when the constructed hexahedron used to partition the distribution of spatial three-dimensional data points is a cube which is constructed according to the maximum value of the three directions, optionally, the position coordinates of the three-dimensional data points to be encoded may be obtained according to the position of the partitioned sub-blocks, the maximum value of the maximum values in the three directions, and the ratio of the length of each side of the final partitioned sub-blocks.

Optionally, first position coordinates of the three-dimensional data points to be encoded may be obtained according to the positions of the sub-blocks obtained by the partition, and the ratio of the shortest side length of the final sub-blocks obtained by the partition to the side lengths in the other two directions, may be obtained respectively. The coordinate value of each coordinate in the remaining two directions may be multiplied by the ratio of the corresponding direction. Then, the inverse quantification of the decoded coordinate values which is inverse to the encoding end can be performed to obtain the actual position coordinate values of all the three-dimensional data points.

In another embodiment, when the constructed hexahedron used to partition the distribution of spatial three-dimensional data points is a cube which is constructed according to the minimum values in the maximum values in the three directions, optionally, the position coordinates of the three-dimensional data points to be encoded may be obtained according to the position of the partitioned sub-blocks, the minimum value of the maximum values in the three directions, and the ratio of the length of each side of the final partitioned sub-blocks.

Optionally, first position coordinates of the three-dimensional data points to be encoded may be obtained according to the positions of the sub-blocks obtained by the partition, and the ratio of the shortest side length of the final sub-blocks obtained by the partition to the side lengths in the other two directions, may be obtained respectively. The coordinate value of each coordinate in the remaining two directions may be multiplied by the ratio of the corresponding direction.

Optionally, the method may further include: decoding the number of three-bit data points in one sub-block containing three-dimensional data points. When the decoded value is 0, it may mean that the corresponding sub-block contains one three-dimensional data point. When the decoded value is 1, it may mean that the corresponding sub-block contains more than one three-dimensional data point, and then may decode the following bits. If the decoded value is N, it may be determined that the number of three-dimensional data points contained is N+1.

In this embodiment, the decoding end may decode the code stream of the three-dimensional data points to be decoded, construct the hexahedron according to the decoded code stream, and perform at least one octree partition process on the hexahedron to obtain the plurality of first-type sub-blocks. And then at least one quadtree partition process and/or binary tree partition process may be performed on at least one first-type sub-block of the plurality of first-type sub-blocks. The position coordinates of the three-dimensional data points to be decoded may be obtained according to the positions of the sub-blocks obtained by partition. Since it is a mixed partition of octree partition, quadtree partition, and binary tree partition, or a mixed partition of octree partition and quadtree partition, or a mixed partition of octree partition and a binary tree partition, the number of partitions may be reduced, and the decoding efficiency may be improved.

In another embodiment of the present disclosure, in the encoding end, a cuboid to be partitioned may be initialized. For example, the maximum values in the three directions may be obtained according to the position coordinates of the three-dimensional data points of the point cloud, and the side lengths in the three directions of the cuboid when the octree partition is initialized may be determined according to the maximum values in the three directions. The side length in each of the three directions may be an integer power of 2, and greater than or equal to and close to the selected maximum value in the corresponding direction.

After the side length of the initialized cuboid is obtained, octree partition and encoding may be performed on the cuboid.

Figure 7:
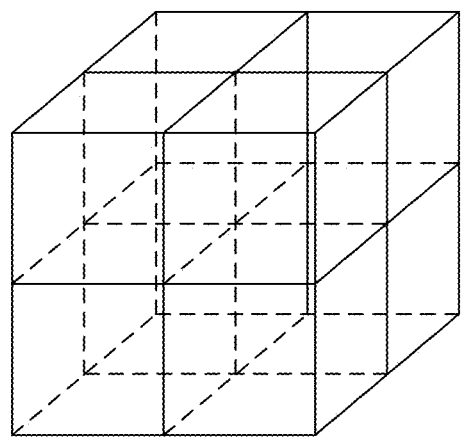
FIG. 7 illustrates an exemplary octree partition process consistent with various embodiments of the present disclosure.

During partition, optionally, each level of the octree partition process may use the coordinates of the center point of the current block to partition for sub-blocks, and may partition the current block to eight smaller sub-blocks using the center point. As shown in FIG. 7, the coordinates of the center point of the current cuboid block are (xmid, ymid, zmid), and correspondingly the coordinate ranges corresponding to the eight sub-blocks obtained by the current octree partition process are respectively: the coordinate range of the first sub-block is x≤xmid, Y≤ymid, z≤zmid, the coordinate value range of the second sub-block is x≤xmid, y≤ymid, z>zmid, and the coordinate value range of the third sub-block is x≤xmid, y>ymid, z≤zmid, the coordinate value range of the fourth sub-block is x≤xmid, y>ymid, z>zmid, the coordinate value range of the fifth sub-block is x>xmid, y≤ymid, z≤zmid, the coordinate value range of the sixth sub-block is x>xmid, y≤ymid, z>zmid, the coordinate value range of the seventh sub-block is x>xmid, y>ymid, z≤zmid, and the coordinate value range of the eighth sub-block is x>xmid, y>ymid, z>zmid.

Figure 8:
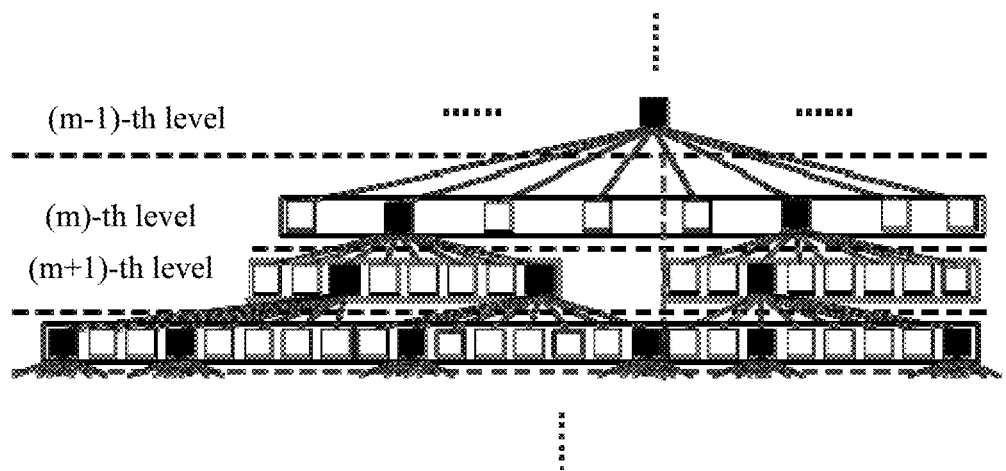
FIG. 8 illustrates an exemplary partition process consistent with various embodiments of the present disclosure.

In the octree encoding process, it may be determined in turn which of the eight sub-blocks all the three-dimensional data points of the point cloud contained in the current block belong to. After that, 8 bits may be then used to encode the sub-block partition of the current block. Optionally, when the current block contains three-dimensional data points, the corresponding bit will be set to 1, otherwise it will be set to 0. For example, when the third sub-block contains three-dimensional data points, the sixth sub-block contains three-dimensional data points, and none of the other sub-blocks contain three-dimensional data points, the encoded 8-bit binary code stream at this time may be set to 0010 0100. Partition may be performed layer by layer according to the sequence shown in FIG. 8.

In the encoding process, the sub-block partition may be performed on the cuboid layer by layer, and the partition of each cuboid block may be encoded one by one. In the encoding process, since the cuboid partition is used, each layer is partitioned according to the method of taking the median value. When the side in one direction reaches the minimum side length first, the partition will not be performed along this direction in the next-layer partition process. In a possible implementation manner, the coordinate values in this direction may all be set to half of the interval less than or equal to the median. For example, when the x-axis first reaches the minimum side length, there may be only four possibilities for the partition process, which are case 1 (x≤xmid, y≤ymid, z≤zmid), case 2 (x≤xmid, y≤ymid, z>zmid), case 3 (x≤xmid, y>ymid, z≤zmid) and case 4 (x≤xmid, y>ymid, z>zmid). The 8-bit numbers corresponding to these four cases for descriptions of octree partition may be xxxx 0000, where x needs to be determined to be 0 or 1 according to whether the previous four sub-blocks contain three-dimensional data points. When the sides in two directions reach the minimum side length first, the partition may not be performed on these two directions in the next partition process, and the coordinate values in these two directions may all be set to half of the interval less than or equal to the median. For example, when the x and y axes first reach the minimum side length, there may be only two possibilities for the partition process. They are case 1 (x≤xmid, y≤ymid, z≤zmid) and case 2 (x≤xmid, y≤ymid, z≤zmid). The 8-bit numbers corresponding to these two cases for descriptions of octree partition may be xx00 0000, where x needs to be determined to be 0 or 1 according to whether the previous two sub-blocks contain three-dimensional data points. When the sides in the three directions reach the minimum side length, the tree partition encoding may end.

The number of three-dimensional data points of the point cloud contained in each smallest sub-block may be encoded. One possible implementation is: when the current leaf node block contains a three-dimensional data point of the point cloud, 0 may be encoded for representation. When the current leaf node block contains more than one three-dimensional data point of the point cloud, for example, when the current leaf node block contains n three-dimensional data points of the point cloud, 1 will be encoded first, and then the value (n−1) will be encoded. The binary bitstream that is previously encoded to represent the octree partition may be sent bit by bit to an arithmetic coding engine for arithmetic encoding, and then the binary bitstream representing the number of three-dimensional data points of the point cloud in the leaf node block may be sent to the arithmetic coding engine for arithmetic encoding. According to the above process, the encoding of the position coordinates in the point cloud data can be realized.

Optionally, the maximum values in the three directions can be written into the header information of the code stream file for use by the decoding end.

In the decoding end, a cuboid for partition may be initialized. The maximum values in the three directions of the position coordinates may be obtained decoding the head information, and the side lengths in the three directions of the cuboid when the octree partition is initialized may be determined according to these three values. The side length in each of the three directions may be an integer power of 2, and greater than or equal to and close to the selected maximum value in the corresponding direction.

Optionally, the tree structure during the encoding may be constructed by decoding the 8-bit number sequentially. Each level of the octree partition process may use the coordinates of the center point of the current block to partition for sub-blocks, and may partition the current block to eight smaller sub-blocks using the center point. When the coordinates of the center point of the current cuboid block are (xmid, ymid, zmid), the coordinate ranges corresponding to the eight sub-blocks obtained by the current octree partition process are respectively: the coordinate range of the first sub-block is x≤xmid, Y≤ymid, z≤zmid, the coordinate value range of the second sub-block is x≤xmid, y≤ymid, z>zmid, and the coordinate value range of the third sub-block is x≤xmid, y>ymid, z≤zmid, the coordinate value range of the fourth sub-block is x≤xmid, y>ymid, z>zmid, the coordinate value range of the fifth sub-block is x>xmid, y≤ymid, z≤zmid, the coordinate value range of the sixth sub-block is x>xmid, y≤ymid, z>zmid, the coordinate value range of the seventh sub-block is x>xmid, y>ymid, z≤zmid, and the coordinate value range of the eighth sub-block is x>xmid, y>ymid, z>zmid. These eight blocks in turn may correspond to 8-bit number from high to low. A possible implementation is that when the corresponding bit is 1, the corresponding sub-block will continue to be partitioned, and when the corresponding bit is 0, the corresponding sub-block will not be further partitioned. When the side length in a certain direction of the partitioned sub-block reaches the minimum side length, the median value in this direction may be made equal to the coordinate value corresponding to the direction in which the minimum side length of the current block is reached, and the other directions may remain unchanged. When the side lengths in the three directions of the partitioned sub-blocks all reach the minimum side length, the partition may end. Then the number of three-dimensional data points corresponding to the point cloud contained in the smallest sub-block may be encoded. In a possible implementation, when a 0 is decoded, the current leaf node block may contain only one three-dimensional data point of the point cloud. When a 1 is decoded, the current leaf node block may contain more than one three-dimensional data point of the point cloud, and then the value (n−1) is decoded, indicating that the current leaf node block contains n three-dimensional data points of the point cloud. The position coordinates of the point cloud may be decoded by decoding the position coordinate bitstream sequentially. According to the above-mentioned scheme, the position coordinate code stream encoded by the coding scheme can be decoded.

In another embodiment, in the encoding end, position coordinate encoding may be performed on the position coordinates of the three-dimensional data points after quantification.

The cuboid to be partitioned may be initialized. For example, the maximum values in the three directions may be obtained according to the position coordinates of the three-dimensional data points of the point cloud, and the side lengths in the three directions of the cuboid when the octree partition is initialized may be determined according to the maximum values in the three directions. The side length in each of the three directions may be an integer power of 2, and greater than or equal to and close to the selected maximum value in the corresponding direction.

After the side length of the initialized cuboid is obtained, octree partition and encoding may be performed on the cuboid.

During partition, optionally, each level of the octree partition process may use the coordinates of the center point of the current block to partition for sub-blocks, and may partition the current block to eight smaller sub-blocks using the center point. As shown in FIG. 7, the coordinates of the center point of the current cuboid block are (xmid, ymid, zmid), and correspondingly the coordinate ranges corresponding to the eight sub-blocks obtained by the current octree partition process are respectively: the coordinate range of the first sub-block is x≤xmid, Y≤ymid, z≤zmid, the coordinate value range of the second sub-block is x≤xmid, y≤ymid, z>zmid, and the coordinate value range of the third sub-block is x≤xmid, y>ymid, z≤zmid, the coordinate value range of the fourth sub-block is x≤xmid, y>ymid, z>zmid, the coordinate value range of the fifth sub-block is x>xmid, y≤ymid, z≤zmid, the coordinate value range of the sixth sub-block is x>xmid, y≤ymid, z>zmid, the coordinate value range of the seventh sub-block is x>xmid, y>ymid, z≤zmid, and the coordinate value range of the eighth sub-block is x>xmid, y>ymid, z>zmid.

In the octree encoding process, it may be determined in turn which of the eight sub-blocks all the three-dimensional data points of the point cloud contained in the current block belong to. After that, an 8-bit number may be used to encode the sub-block partition of the current block. In a possible implementation method, when the current block contains a three-dimensional data point of the point cloud, the corresponding value will be set to 1, otherwise it will be set to 0. For example, when the third sub-block contains three-dimensional data points of the point cloud, the sixth sub-block contains three-dimensional data points of the point cloud, and the other sub-blocks contain no cloud three-dimensional data points, the encoded 8-bit binary code stream may be 0010 0100. In the encoding process, the sub-block partition may be performed on the cuboid layer by layer, and the partition of each cuboid block may be encoded one by one. In the encoding process, since the cuboid partition is used, each layer is partitioned according to the method of taking the median value. When the side in one direction reaches the minimum side length first, the partition and encoding will be performed along the remaining two directions in the next-level partition process, but not along the direction whose side length reaches the minimum side length. The tree partition may change to the quadtree partition. For example, when the x axis reaches the minimum side length first, the partition center may be (ymid, zmid), and correspondingly, there may be only four possibilities for the partition process, which are case 1 (x≤xmid, y≤ymid, z≤zmid), case 2 (x≤xmid, y≤ymid, z>zmid), case 3 (x≤xmid, y>ymid, z≤zmid) and case 4 (x≤xmid, y>ymid, z>zmid). Only 4 bits may be needed to describe the current partition. For example, when the first sub-block and the fourth sub-block contain the three-dimensional data points of the point cloud, other sub-blocks do not contain the three-dimensional data points of the point cloud, the 4-bit binary code stream after encoding may be 1001. When the sides in two directions reaches the minimum side length first, the partition and encoding will be performed along the remaining direction in the next-level partition process, but not along these two directions whose side lengths reach the minimum side length. The tree partition may change to the binary tree partition. For example, when the x and y axes first reach the minimum side length, the partition center may be (zmid) and there may be only two possibilities for the partition process. The two possibilities may be case 1 (x≤xmid, y≤ymid, z≤zmid) and case 2 (x≤xmid, y≤ymid, z>zmid). Only 2 bits may be needed to describe the current partition. For example, when the first sub-block contains the three-dimensional data points of the point cloud and the second sub-block does not contain the three-dimensional data points of the point cloud, the 2-bit binary code stream after encoding may be 10. When the sides in the three directions reach the minimum side length, the tree partition encoding may end.

Then the number of three-dimensional data points of the point cloud contained in each smallest sub-block may be encoded. One possible implementation is: when the current leaf node block contains a three-dimensional data point of the point cloud, 0 may be encoded for representation. When the current leaf node block contains more than one three-dimensional data point of the point cloud, for example, when the current leaf node block contains n three-dimensional data points of the point cloud, 1 will be encoded first, and then the value (n−1) will be encoded. The binary bitstream that is previously encoded to represent the octree partition may be sent byte by byte to an arithmetic coding engine for arithmetic encoding, and then the binary bitstream representing the number of three-dimensional data points of the point cloud in the leaf node block may be sent to the arithmetic coding engine for arithmetic encoding. According to the above process, the encoding of the position coordinates in the point cloud data can be realized.

Optionally, the maximum values in the three directions can be written into the header information of the code stream file for use by the decoding end.

In the decoding end, a cuboid for partition may be initialized. The maximum values in the three directions of the position coordinates may be obtained by decoding the head information, and the side lengths in the three directions of the cuboid when the octree partition is initialized may be determined according to these three values. The side length in each of the three directions may be an integer power of 2, and greater than or equal to and close to the selected maximum value in the corresponding direction.

Optionally, the tree structure during the encoding may be constructed by decoding the 8-bit number sequentially. Each level of the octree partition process may use the coordinates of the center point of the current block to partition for sub-blocks, and may partition the current block to eight smaller sub-blocks using the center point. When the coordinates of the center point of the current cuboid block are (xmid, ymid, zmid), the coordinate ranges corresponding to the eight sub-blocks obtained by the current octree partition process are respectively: the coordinate range of the first sub-block is x≤xmid, Y≤ymid, z≤zmid, the coordinate value range of the second sub-block is x≤xmid, y≤ymid, z>zmid, and the coordinate value range of the third sub-block is x≤xmid, y>ymid, z≤zmid, the coordinate value range of the fourth sub-block is x≤xmid, y>ymid, z>zmid, the coordinate value range of the fifth sub-block is x>xmid, y≤ymid, z≤zmid, the coordinate value range of the sixth sub-block is x>xmid, y≤ymid, z>zmid, the coordinate value range of the seventh sub-block is x>xmid, y>ymid, z≤zmid, and the coordinate value range of the eighth sub-block is x>xmid, y>ymid, z>zmid. Each of these eight blocks in turn may correspond to one bit of the 8-bit number from high to low. A possible implementation is that when the corresponding bit is 1, the corresponding sub-block will continue to be partitioned, and when the corresponding bit is 0, the corresponding sub-block will not be further partitioned. When the side length in a certain direction of the partitioned sub-block reaches the minimum side length, 4 bits may be decoded each time subsequently, and each bit of the 4 bits may correspond to one block of the four blocks obtained by the quadtree partition, and when the corresponding bit is 1, the corresponding sub-block will continue to be partitioned, while when the corresponding bit is 0, the corresponding sub-block will not be further partitioned. When the side lengths in two directions of the partitioned sub-block reach the minimum side length, 2 bits may be decoded each time subsequently, and each bit of the 2 bits may correspond to one block of the two blocks obtained by the binary tree partition, and when the corresponding bit is 1, the corresponding sub-block will continue to be partitioned, while when the corresponding bit is 0, the corresponding sub-block will not be further partitioned. When the side lengths in the three directions of the partitioned sub-block reach the minimum side length, the partition may end. Then the number of three-dimensional data points corresponding to the point cloud contained in the smallest sub-block may be encoded. In a possible implementation, when a 0 is decoded, the current leaf node block may contain only one three-dimensional data point of the point cloud. When a 1 is decoded, the current leaf node block may contain more than one three-dimensional data point of the point cloud, and then the value (n−1) is decoded, indicating that the current leaf node block contains n three-dimensional data points of the point cloud. The position coordinates of the point cloud may be decoded by decoding the position coordinate bitstream sequentially. According to the above-mentioned scheme, the position coordinate code stream encoded by the coding scheme can be decoded.

In another embodiment, in the encoding end, position coordinate encoding may be performed on the position coordinates of the three-dimensional data points after quantification.

The cuboid to be partitioned may be initialized. For example, the maximum values in the three directions may be obtained according to the position coordinates of the three-dimensional data points of the point cloud, and the side lengths in the three directions of the cuboid when the octree partition is initialized may be determined according to the maximum values in the three directions. The side length in each of the three directions may be an integer power of 2, and greater than or equal to and close to the selected maximum value in the corresponding direction.

After the side length of the initialized cuboid is obtained, octree partition and encoding may be performed on the cuboid.

During encoding process, optionally, the sub-block partition of the cuboid may be performed level by level, and the partition of each cuboid block may be coded one by one. In the encoding process, because the cuboid is used, in each level the partition may be performed according to the median method, and it cannot guarantee that the side lengths in the three directions reach the minimum side length at the same time.

When all side lengths in the three directions do not reach the minimum side length, each level of the octree partition process may use the coordinates of the center point of the current block to perform the sub-block partition, and may partition the current block to eight smaller sub-blocks using the center point. When the coordinates of the center point of the current cuboid block are (xmid, ymid, zmid), the coordinate ranges corresponding to the eight sub-blocks obtained by the current octree partition process are respectively: the coordinate range of the first sub-block is x≤xmid, y≤ymid, z≤zmid, the coordinate value range of the second sub-block is x≤xmid, y≤ymid, z>zmid, and the coordinate value range of the third sub-block is x≤xmid, y>ymid, z≤zmid, the coordinate value range of the fourth sub-block is x≤xmid, y>ymid, z>zmid, the coordinate value range of the fifth sub-block is x>xmid, y≤ymid, z≤zmid, the coordinate value range of the sixth sub-block is x>xmid, y≤ymid, z>zmid, the coordinate value range of the seventh sub-block is x>xmid, y>ymid, z≤zmid, and the coordinate value range of the eighth sub-block is x>xmid, y>ymid, z>zmid. In the octree encoding process, it may be determined in turn which of the eight sub-blocks all the three-dimensional data points of the point cloud contained in the current block belong to. After that, an 8-bit number may be used to encode the sub-block partition of the current block. In a possible implementation method, when the current block contains a three-dimensional data point of the point cloud, the corresponding value will be set to 1, otherwise it will be set to 0. For example, when the third sub-block contains three-dimensional data points of the point cloud, the sixth sub-block contains three-dimensional data points of the point cloud, and the other sub-blocks contain no cloud three-dimensional data points, the encoded 8-bit binary code stream may be 0010 0100. Partition may be performed level by level in the order shown in FIG. 8. During encoding process, optionally, the sub-block partition of the cuboid may be performed level by level, and the partition of each cuboid block may be coded one by one.

When the side length in one direction reaches the minimum side length first, in one possible implementation, 8 bits may be encoded to 0, that is, encoded to 0000 0000, for representation, and then 3 bits may be encoded to indicate which direction of the three directions reaches the minimum side length first. For example, one possible correspondence may be: 000 indicates that the side length in the x direction reaches the minimum side length first, 001 indicates that the side length in the y direction reaches the minimum side length first, and 010 indicates that the side length in the z direction reaches the minimum side length first. Subsequently, the quadtree partition and encoding may be performed in the two directions in which the side lengths do not reach the minimum side length. For example, when the x axis reaches the minimum side length first, the partition center may be (ymid, zmid), and correspondingly, there may be only four possibilities for the partition process, which are case 1 (x≤xmid, y≤ymid, z≤zmid), case 2 (x≤xmid, y≤ymid, z>zmid), case 3 (x≤xmid, y>ymid, z≤zmid) and case 4 (x≤xmid, y>ymid, z>zmid). Only 4 bits may be needed to describe the current partition. For example, when the first sub-block and the fourth sub-block contain the three-dimensional data points of the point cloud, other sub-blocks do not contain the three-dimensional data points of the point cloud, the 4-bit binary code stream after encoding may be 1001. Subsequently, the quadtree partition of the cuboid may be performed level by level, and the partition of each cuboid block may be coded one by one. There may be two cases for the side lengths in the directions reaching the minimum side length.

In the first case, the side length of one of the remaining two directions reaches the minimum side length. 4 bits may be encoded to 0, that is, encoded to 0000, for representation first, and then 2 bits may be encoded to indicate which direction of the remaining two directions reaches the minimum side length first. For example, one possible correspondence may be: 00 indicates that the side length in the first one of the remaining two directions in an order of xyz reaches the minimum side length first, and 01 indicates that the side length in the last one of the remaining two directions in an order of xyz reaches the minimum side length first. For example, when the x axis first reaches the minimum side length and the z-axis reaches the minimum side length then, since z is the last one in the remaining two directions y and z in the order of xyz, 01 may be encoded to represent this and subsequently the binary tree partition and encoding may be performed in a remaining direction in which the side length does not reach the minimum side length and the partition center may be (ymid). There may be only two possibilities for the partition process. The two possibilities may be case 1 (y≤ymid) and case 2 (y>ymid). Only 2 bits may be needed to describe the current partition. For example, when the first sub-block contains the three-dimensional data points of the point cloud and the second sub-block does not contain the three-dimensional data points of the point cloud, the 2-bit binary code stream after encoding may be 10. Subsequently, the binary tree partition of the cuboid may be performed level by level, and the partition of each cuboid block may be coded one by one, until the side length in the remaining direction also reaches the minimum side length. Two bits of 00 may indicate the tree partition on the cuboid may end.

In the second case, the side lengths in the remaining two directions reach the minimum side length simultaneously, and the side lengths in the three directions all reach the minimum side length correspondingly when combining the direction in which the side length reaches the minimum side length first. In one possible implementation, 4 bits may be encoded to 0, that is, encoded to 0000, for representation first, and then 2 bits of 10 or 11 may be encoded to indicate the tree partition on the cuboid may end.

When the side lengths in two directions reach the minimum side length first, in one possible implementation, 8 bits may be encoded to 0, that is, 0000 0000, for representation, and then 3 bits may be encoded to indicate which remaining direction of the three directions does not reach the minimum side length. For example, one possible correspondence may be: 100 indicates that the side length in the x direction does not reach the minimum side length first, 101 indicates that the side length in the y direction does not reach the minimum side length first, and 110 indicates that the side length in the z direction does not reach the minimum side length first. Subsequently, the binary tree partition and encoding may be performed in the remaining direction in which the side lengths do not reach the minimum side length. For example, when the x axis and the y axis reach the minimum side length first, the partition center may be (zmid), and correspondingly, there may be only two possibilities for the partition process, which are case 1 (z≤zmid), and case 2 (z>zmid). Only 2 bits may be needed to describe the current partition. For example, when the first sub-block contains the three-dimensional data points of the point cloud and then second sub-blocks do not contain the three-dimensional data points of the point cloud, the 2-bit binary code stream after encoding may be 10. Subsequently, the binary tree partition of the cuboid may be performed level by level, and the partition of each cuboid block may be coded one by one, until the side length in the remaining direction also reaches the minimum side length. Two bits of 00 may indicate the tree partition on the cuboid may end.

When the side lengths in the three directions reach the minimum side length at the same time, 8 bits may be encoded to 0, that is, 0000 0000, for representation, and then 3 bits may be encoded to 111, for indicating that the tree partition on the cuboid may end.

Then the number of three-dimensional data points of the point cloud contained in each smallest sub-block may be encoded. One possible implementation is: when the current leaf node block contains a three-dimensional data point of the point cloud, 0 may be encoded for representation. When the current leaf node block contains more than one three-dimensional data point of the point cloud, for example, when the current leaf node block contains n three-dimensional data points of the point cloud, 1 will be encoded first, and then the value (n−1) will be encoded. The binary bitstream that is previously encoded to represent the octree partition may be sent byte by byte to an arithmetic coding engine for arithmetic encoding, and then the binary bitstream representing the number of three-dimensional data points of the point cloud in the leaf node block may be sent to the arithmetic coding engine for arithmetic encoding. According to the above process, the encoding of the position coordinates in the point cloud data can be realized.

Optionally, the maximum values in the three directions can be written into the header information of the code stream file for use by the decoding end.

In the decoding end, a cuboid for partition may be initialized.

The maximum value in the maximum values in the three directions of the position coordinates may be obtained by decoding the head information, and the side lengths in the three directions of the cuboid when the octree partition is initialized may be determined according to these three values. The side length in each of the three directions may be an integer power of 2, and greater than or equal to and close to the selected maximum value in the corresponding direction.

Optionally, the tree structure during the encoding may be constructed by decoding the 8-bit number sequentially. Each level of the octree partition process may use the coordinates of the center point of the current block to partition for sub-blocks, and may partition the current block to eight smaller sub-blocks using the center point. After the sub-block partition, the decoded 8 bits may be used to determine sub-blocks containing the three-dimensional data points of the point cloud. For one sub-block, when the corresponding one bit is 1, the sub-block may contain the three-dimensional data points of the point cloud and may be partitioned further; when the corresponding one bit is 0, the sub-block may not contain the three-dimensional data points of the point cloud and may not be partitioned further. Arithmetic decoding may be performed by every 8 bits, and there may be multiple cases when decoding to 8 bits of 0, that is, 0000 0000.

In one case, when decoded to 8 bits of 0, which is 0000 0000, then 3 bits may be decoded. When it is decoded to 000, 001, or 010, it may mean that partition is converted to quadtree partition. When it is decoded to 000, it may mean that the side length in the x-axis direction reaches the minimum side length first. When it is decoded to 001, it may mean that the side length in the y-axis direction reaches the minimum side length first. When it is decoded to 010, it may mean that the side length in the z-axis direction reaches the minimum side length first. And it indicates that the next code stream is to perform quadtree partition and encoding in the remaining two directions that do not reach the minimum side length. For example, when the x axis reaches the minimum side length first, the partition center may be (ymid, zmid), and correspondingly, there may be only four possibilities for the partition process, which are case 1 (x≤xmid, y≤ymid, z≤zmid), case 2 (x≤xmid, y≤ymid, z>zmid), case 3 (x≤xmid, y>ymid, z≤zmid) and case 4 (x≤xmid, y>ymid, z>zmid). Only 4 bits may be needed to describe the current partition. Correspondingly the decoding may be performed by every 4 bits, and the decoded 4 bits may be used to determine sub-blocks containing the three-dimensional data points of the point cloud. For one sub-block, when the corresponding one bit is 1, the sub-block may contain the three-dimensional data points of the point cloud and may be partitioned further; when the corresponding one bit is 0, the sub-block may not contain the three-dimensional data points of the point cloud and may not be partitioned further. Arithmetic decoding may be performed by every 4 bits, and there may be multiple cases when decoding to 4 bits of 0, that is, 0000.

In another case, when decoded to 4 bits of 0, which is 0000, then 2 bits may be decoded. When it is decoded to 00 or 01, it may mean that partition is converted to quadtree partition. When it is decoded to 000, it may mean that the side length in one of previous remaining two directions reaches the minimum side length first. When it is decoded to 00, it may mean that the side length in one of the remaining two directions which is located first in the xyz order reaches the minimum side length first. When it is decoded to 01, it may mean that the side length in one of the remaining two directions which is located last in the xyz order reaches the minimum side length first. For example, when the x axis first reaches the minimum side length and the z-axis reaches the minimum side length then, since z is the last one in the remaining two directions y and z in the order of xyz, 01 may be encoded to represent this and subsequently the binary tree partition and encoding may be performed in a remaining direction in which the side length does not reach the minimum side length and the partition center may be (ymid). There may be only two possibilities for the partition process. The two possibilities may be case 1 (y≤ymid) and case 2 (y>ymid). Only 2 bits may be needed to describe the current partition. Correspondingly the decoding may be performed by every 2 bits, and the decoded 2 bits may be used to determine sub-blocks containing the three-dimensional data points of the point cloud. For one sub-block, when the corresponding one bit is 1, the sub-block may contain the three-dimensional data points of the point cloud and may be partitioned further; when the corresponding one bit is 0, the sub-block may not contain the three-dimensional data points of the point cloud and may not be partitioned further. Arithmetic decoding may be performed by every 2 bits, and when decoding to 2 bits of 0, that is, 000, the partition of the cuboid may end.

In another case, when decoded to 4 bits of 0, which is 0000, then 2 bits may be decoded. When it is decoded to 11 or 10, the side lengths in the remaining two directions may also reach the minimum side length, and the partition of the cuboid may end.

In another case, when decoded to 8 bits of 0, which is 0000 0000, then 3 bits may be decoded. When it is decoded to 100, 101, or 110, it may mean that partition is converted to binary tree partition. When it is decoded to 100, it may mean that the side length in the x-axis direction does not reach the minimum side length first. When it is decoded to 101, it may mean that the side length in the y-axis direction does not reach the minimum side length first. When it is decoded to 110, it may mean that the side length in the z-axis direction does not reach the minimum side length first. And it indicates that the next code stream is to perform quadtree partition and encoding in the remaining direction that does not reach the minimum side length. For example, when the x axis and the y axis reach the minimum side length first, the partition center may be (ymid). There may be only two possibilities for the partition process. The two possibilities may be case 1 (y≤ymid) and case 2 (y>ymid). Only 2 bits may be needed to describe the current partition. Correspondingly the decoding may be performed by every 2 bits, and the decoded 2 bits may be used to determine sub-blocks containing the three-dimensional data points of the point cloud. For one sub-block, when the corresponding one bit is 1, the sub-block may contain the three-dimensional data points of the point cloud and may be partitioned further; when the corresponding one bit is 0, the sub-block may not contain the three-dimensional data points of the point cloud and may not be partitioned further. Arithmetic decoding may be performed by every 2 bits, and when decoding to 2 bits of 0, that is, 000, the partition of the cuboid may end.

In another case, when decoded to 8 bits of 0, which is 0000 0000, then 3 bits may be decoded. When it is decoded to 111, the side lengths in the three directions may reach the minimum side length simultaneously, and the partition of the cuboid may end.

After the partition of the cuboid is decoded, since the cuboid with unequal side lengths is used for partition and encoding, the side lengths may need to be scaled as follows. The following implementations are examples only and do limit the scope of the present disclosure.

In one possible implementation, when the octree, quadtree, and binary trees are mixed, the side length of the first direction to end the partition may be a, and the side length of the second direction to end the partition may be b, and the side length in the third direction to end the partition may be c. At this time, the side length c may be the true minimum side length. Correspondingly, the position coordinates of the direction where the partition ends first may be all multiplied by c/a to achieve the scaling of the direction where the partition ends first, and the position coordinates of the direction where the partition ends second may be all multiplied by c/b, to achieve the scaling of the direction where the partition ends second. According to the above method, the position coordinates can be decoded when the octree, quadtree, and binary trees are mixed.

In another possible implementation, when the octree and the quadtree are mixed, the side length of the first direction to end the partition may be a, and the side length in other two directions where the partition ends subsequently may be d. Correspondingly, the position coordinates of the direction where the partition ends first may be all multiplied by d/a to achieve the scaling of the direction where the partition ends first. According to the above method, the position coordinates can be decoded when the octree and the quadtree are mixed.

In another possible implementation, when the octree and binary trees are mixed, the side lengths in the two directions where the partition ends first may be a, and the side length of another direction where the partition ends second may be e. Correspondingly, the position coordinates of the two directions where the partition ends first may be all multiplied by e/a to achieve the scaling of the two directions where the partition ends first. According to the above method, the position coordinates can be decoded when the octree and binary trees are mixed.

When only the octree is used, the partition may be completed in the three directions simultaneously, that is, the side lengths in the three directions may reach the minimum side length simultaneously and the scaling may not be necessary.

After decoding the position coordinates, the number of the points of the point cloud corresponding to each position coordinate may be decoded. In a possible implementation, when a 0 is decoded, the current leaf node block may contain only one three-dimensional data point of the point cloud. When a 1 is decoded, the current leaf node block may contain more than one three-dimensional data point of the point cloud, and then the value (n−1) is decoded, indicating that the current leaf node block contains n three-dimensional data points of the point cloud. The position coordinates of the point cloud may be decoded by decoding the position coordinate bitstream sequentially. According to the above-mentioned scheme, the position coordinate code stream encoded by the coding scheme can be decoded.

In another embodiment, in the encoding end, position coordinate encoding may be performed on the position coordinates of the three-dimensional data points after quantification.

The cuboid to be partitioned may be initialized. For example, the maximum values in the three directions may be obtained according to the position coordinates of the three-dimensional data points of the point cloud. The maximum values in the three directions may be obtained respectively, and the side lengths in the three directions of the cuboid when the octree partition is initialized may be determined according to the maximum values in the three directions. The side length in each of the three directions may be an integer power of 2, and greater than or equal to and close to the selected maximum value in the corresponding direction.

After the side length of the initialized cuboid is obtained, partition and encoding may be performed on the cuboid.

During encoding process, optionally, the sub-block partition of the cuboid may be performed level by level, and the partition of each cuboid block may be coded one by one. In the encoding process, because the cuboid is used, in each level the partition may be performed according to the median method, and it cannot guarantee that the side lengths in the three directions reach the minimum side length at the same time.

When all side lengths in the three directions do not reach the minimum side length, each level of the octree partition process may use the coordinates of the center point of the current block to perform the sub-block partition, and may partition the current block to eight smaller sub-blocks using the center point. When the coordinates of the center point of the current cuboid block are (xmid, ymid, zmid), the coordinate ranges corresponding to the eight sub-blocks obtained by the current octree partition process are respectively: the coordinate range of the first sub-block is x≤xmid, y≤ymid, z≤zmid, the coordinate value range of the second sub-block is x≤xmid, y≤ymid, z>zmid, and the coordinate value range of the third sub-block is x≤xmid, y>ymid, z≤zmid, the coordinate value range of the fourth sub-block is x≤xmid, y>ymid, z>zmid, the coordinate value range of the fifth sub-block is x>xmid, y≤ymid, z≤zmid, the coordinate value range of the sixth sub-block is x>xmid, y≤ymid, z>zmid, the coordinate value range of the seventh sub-block is x>xmid, y>ymid, z≤zmid, and the coordinate value range of the eighth sub-block is x>xmid, y>ymid, z>zmid. In the octree encoding process, it may be determined in turn which of the eight sub-blocks all the three-dimensional data points of the point cloud contained in the current block belong to. After that, 8-bit number may be used to encode the sub-block partition of the current block. In a possible implementation method, when the current block contains a three-dimensional data point of the point cloud, the corresponding value will be set to 1, otherwise it will be set to 0. For example, when the third sub-block contains three-dimensional data points of the point cloud, the sixth sub-block contains three-dimensional data points of the point cloud, and the other sub-blocks contain no cloud three-dimensional data points, the encoded 8-bit binary code stream may be 0010 0100. Partition may be performed level by level in the order shown in FIG. 10. During encoding process, optionally, the sub-block partition of the cuboid may be performed level by level, and the partition of each cuboid block may be coded one by one.

When the side length in one direction reaches the minimum side length first, in one possible implementation, 8 bits may be encoded to 0, that is, encoded to 0000 0000, for representation, and then 3 bits may be encoded to indicate which direction of the three directions reaches the minimum side length first. For example, one possible correspondence may be: 000 indicates that the side length in the x direction reaches the minimum side length first, 001 indicates that the side length in the y direction reaches the minimum side length first, and 010 indicates that the side length in the z direction reaches the minimum side length first. Subsequently, the quadtree partition and encoding may be performed in the two directions in which the side lengths do not reach the minimum side length. For example, when the x axis reaches the minimum side length first, the partition center may be (ymid, zmid), and correspondingly, there may be only four possibilities for the partition process, which are case 1 (y≤ymid, z≤zmid), case 2 (y≤ymid, z>zmid), case 3 (y>ymid, z≤zmid) and case 4 (y>ymid, z>zmid). Only 4 bits may be needed to describe the current partition. For example, when the first sub-block and the fourth sub-block contain the three-dimensional data points of the point cloud, other sub-blocks do not contain the three-dimensional data points of the point cloud, the 4-bit binary code stream after encoding may be 1001. Subsequently, the quadtree partition of the cuboid may be performed level by level, and the partition of each cuboid block may be coded one by one. There may be two cases for the side lengths in the directions reaching the minimum side length.

In the first case, the side length of one of the remaining two directions reaches the minimum side length. 4 bits may be encoded to 0, that is, encoded to 0000, for representation first, and then 2 bits may be encoded to indicate which direction of the remaining two directions reaches the minimum side length first. For example, one possible correspondence may be: 00 indicates that the side length in first one of the remaining two directions in an order of xyz reaches the minimum side length first, and 01 indicates that the side length in the last one of the remaining two directions in an order of xyz reaches the minimum side length first. For example, when the x axis first reaches the minimum side length and the z-axis reaches the minimum side length then, since z is the last one in the remaining two directions y and z in the order of xyz, 01 may be encoded to represent this and subsequently the binary tree partition and encoding may be performed in a remaining direction in which the side length does not reach the minimum side length and the partition center may be (ymid). There may be only two possibilities for the partition process. The two possibilities may be case 1 (y≤ymid) and case 2 (y>ymid). Only 2 bits may be needed to describe the current partition. For example, when the first sub-block contains the three-dimensional data points of the point cloud and the second sub-block does not contain the three-dimensional data points of the point cloud, the 2-bit binary code stream after encoding may be 10. Subsequently, the binary tree partition of the cuboid may be performed level by level, and the partition of each cuboid block may be coded one by one, until the side length in the remaining direction also reaches the minimum side length. Two bits of 00 may indicate the tree partition on the cuboid may end.

In the second case, the side lengths in the remaining two directions reach the minimum side length simultaneously, and the side lengths in the three directions all reach the minimum side length correspondingly when combining the direction in which the side length reaches the minimum side length first. In one possible implementation, 4 bits may be encoded to 0, that is, encoded to 0000, for representation first, and then 2 bits of 10 or 11 may be encoded to indicate the tree partition on the cuboid may end.

When the side lengths in two directions reach the minimum side length first, in one possible implementation, 8 bits may be encoded to 0, that is, 0000 0000, for representation, and then 3 bits may be encoded to indicate which remaining direction of the three directions does not reach the minimum side length. For example, one possible correspondence may be: 100 indicates that the side length in the x direction does not reach the minimum side length first, 101 indicates that the side length in the y direction does not reach the minimum side length first, and 110 indicates that the side length in the z direction does not reach the minimum side length first. Subsequently, the binary tree partition and encoding may be performed in the remaining direction in which the side lengths do not reach the minimum side length. For example, when the x axis and the y axis reach the minimum side length first, the partition center may be (zmid), and correspondingly, there may be only two possibilities for the partition process, which are case 1 (z≤zmid), and case 2 (z>zmid). Only 2 bits may be needed to describe the current partition. For example, when the first sub-block contains the three-dimensional data points of the point cloud and then second sub-blocks do not contain the three-dimensional data points of the point cloud, the 2-bit binary code stream after encoding may be 10. Subsequently, the binary tree partition of the cuboid may be performed level by level, and the partition of each cuboid block may be coded one by one, until the side length in the remaining direction also reaches the minimum side length. Two bits of 00 may indicate the tree partition on the cuboid may end.

When the side lengths in the three directions reach the minimum side length at the same time, 8 bits may be encoded to 0, that is, 0000 0000, for representation, and then 3 bits may be encoded to 111, for indicating that the tree partition on the cuboid may end.

Then the number of three-dimensional data points of the point cloud contained in each smallest sub-block may be encoded. One possible implementation is: when the current leaf node block contains a three-dimensional data point of the point cloud, 0 may be encoded for representation. When the current leaf node block contains more than one three-dimensional data point of the point cloud, for example, when the current leaf node block contains n three-dimensional data points of the point cloud, 1 will be encoded first, and then the value (n−1) will be encoded. The binary bitstream that is previously encoded to represent the octree partition may be sent byte by byte to an arithmetic coding engine for arithmetic encoding, and then the binary bitstream representing the number of three-dimensional data points of the point cloud in the leaf node block may be sent to the arithmetic coding engine for arithmetic encoding. According to the above process, the encoding of the position coordinates in the point cloud data can be realized.

Optionally, the maximum values in the three directions can be written into the header information of the code stream file for use by the decoding end.

In the decoding end, a cuboid for partition may be initialized.

The minimum value in the maximum values in the three directions of the position coordinates may be obtained by decoding the head information, and the side lengths in the three directions of the cuboid when the octree partition is initialized may be determined according to this minimum value. The side length in each of the three directions may be an integer power of 2, and greater than or equal to and close to the selected maximum value in the corresponding direction.

Optionally, the tree structure during the encoding may be constructed by decoding the 8-bit number sequentially. Each level of the octree partition process may use the coordinates of the center point of the current block to partition for sub-blocks, and may partition the current block to eight smaller sub-blocks using the center point. After the sub-block partition, the decoded 8 bits may be used to determine sub-blocks containing the three-dimensional data points of the point cloud. For one sub-block, when the corresponding one bit is 1, the sub-block may contain the three-dimensional data points of the point cloud and may be partitioned further; when the corresponding one bit is 0, the sub-block may not contain the three-dimensional data points of the point cloud and may not be partitioned further. Arithmetic decoding may be performed by every 8 bits, and there may be multiple cases when decoding to 8 bits of 0, that is, 0000 0000.

In one case, when decoded to 8 bits of 0, which is 0000 0000, then 3 bits may be decoded. When it is decoded to 000, 001, or 010, it may mean that partition is converted to quadtree partition. When it is decoded to 000, it may mean that the side length in the x-axis direction reaches the minimum side length first. When it is decoded to 001, it may mean that the side length in the y-axis direction reaches the minimum side length first. When it is decoded to 010, it may mean that the side length in the z-axis direction reaches the minimum side length first. And it indicates that the next code stream is to perform quadtree partition and encoding in remaining two directions that do not reach the minimum side length. For example, when the x axis reaches the minimum side length first, the partition center may be (ymid, zmid), and correspondingly, there may be only four possibilities for the partition process, which are case 1 (y≤ymid, z≤zmid), case 2 (y≤ymid, z>zmid), case 3 (y>ymid, z≤zmid) and case 4 (y>ymid, z>zmid). Only 4 bits may be needed to describe the current partition. Correspondingly the decoding may be performed by every 4 bits, and the decoded 4 bits may be used to determine sub-blocks containing the three-dimensional data points of the point cloud. For one sub-block, when the corresponding one bit is 1, the sub-block may contain the three-dimensional data points of the point cloud and may be partitioned further; when the corresponding one bit is 0, the sub-block may not contain the three-dimensional data points of the point cloud and may not be partitioned further. Arithmetic decoding may be performed by every 4 bits, and there may be multiple cases when decoding to 4 bits of 0, that is, 0000.

In one case, when decoded to 4 bits of 0, which is 0000, then 2 bits may be decoded. When it is decoded to 00 or 01, it may mean that partition is converted to quadtree partition. When it is decoded to 000, it may mean that the side length in one of previous remaining two directions reaches the minimum side length first. When it is decoded to 00, it may mean that the side length in one of the remaining two directions which is located first in the xyz order reaches the minimum side length first. When it is decoded to 01, it may mean that the side length in one of the remaining two directions which is located last in the xyz order reaches the minimum side length first. For example, when the x axis first reaches the minimum side length and the z-axis reaches the minimum side length then, since z is the last one in the remaining two directions y and z in the order of xyz, 01 may be encoded to represent this and subsequently the binary tree partition and encoding may be performed in a remaining direction in which the side length does not reach the minimum side length and the partition center may be (ymid). There may be only two possibilities for the partition process. The two possibilities may be case 1 (y≤ymid) and case 2 (y>ymid). Only 2 bits may be needed to describe the current partition. Correspondingly the decoding may be performed by every 2 bits, and the decoded 2 bits may be used to determine sub-blocks containing the three-dimensional data points of the point cloud. For one sub-block, when the corresponding one bit is 1, the sub-block may contain the three-dimensional data points of the point cloud and may be partitioned further; when the corresponding one bit is 0, the sub-block may not contain the three-dimensional data points of the point cloud and may not be partitioned further. Arithmetic decoding may be performed by every 2 bits, and when decoding to 2 bits of 0, that is, 000, the partition of the cuboid may end.

In another case, when decoded to 4 bits of 0, which is 0000, then 2 bits may be decoded. When it is decoded to 11 or 10, the side lengths in the remaining two directions may also reach the minimum side length, and the partition of the cuboid may end.

In one possible implementation, when decoded to 8 bits of 0, which is 0000 0000, then 3 bits may be decoded. When it is decoded to 100, 101, or 110, it may mean that partition is converted to binary tree partition. When it is decoded to 100, it may mean that the side length in the x-axis direction does not reach the minimum side length first. When it is decoded to 101, it may mean that the side length in the y-axis direction does not reach the minimum side length first. When it is decoded to 110, it may mean that the side length in the z-axis direction does not reach the minimum side length first. And it indicates that the next code stream is to perform quadtree partition and encoding in remaining direction that does not reach the minimum side length. For example, when the x axis and the y axis reach the minimum side length first, the partition center may be (zmid). There may be only two possibilities for the partition process. The two possibilities may be case 1 (z≤ymid) and case 2 (z>ymid). Only 2 bits may be needed to describe the current partition. Correspondingly the decoding may be performed by every 2 bits, and the decoded 2 bits may be used to determine sub-blocks containing the three-dimensional data points of the point cloud. For one sub-block, when the corresponding one bit is 1, the sub-block may contain the three-dimensional data points of the point cloud and may be partitioned further; when the corresponding one bit is 0, the sub-block may not contain the three-dimensional data points of the point cloud and may not be partitioned further. Arithmetic decoding may be performed by every 2 bits, and when decoding to 2 bits of 0, that is, 000, the partition of the cuboid may end.

In one possible implementation, when decoded to 8 bits of 0, which is 0000 0000, then 3 bits may be decoded. When it is decoded to 111, the side lengths in the three directions may reach the minimum side length simultaneously, and the partition of the cuboid may end.

After the partition of the cuboid is decoded, since the cuboid with unequal side lengths is used for partition and encoding, the side lengths may need to be scaled as follows. The following implementations are examples only and do limit the scope of the present disclosure.

In one possible implementation, when the octree, quadtree, and binary trees are mixed, the side length of the first direction to end the partition may be a, and the side length of the second direction to end the partition may be b, and the side length in the third direction to end the partition may be c. At this time, the side length c may be the true minimum side length. Correspondingly, the position coordinates of the direction where the partition ends first may be all multiplied by c/a to achieve the scaling of the direction where the partition ends first, and the position coordinates of the direction where the partition ends second may be all multiplied by c/b, to achieve the scaling of the direction where the partition ends second. According to the above method, the position coordinates can be decoded when the octree, quadtree, and binary trees are mixed.

In another possible implementation, when the octree and the quadtree are mixed, the side length of the first direction to end the partition may be a, and the side length in other two directions where the partition ends subsequently may be d. Correspondingly, the position coordinates of the direction where the partition ends first may be all multiplied by d/a to achieve the scaling of the direction where the partition ends first. According to the above method, the position coordinates can be decoded when the octree and the quadtree are mixed.

In another possible implementation, when the octree and binary trees are mixed, the side lengths in the two directions where the partition ends first may be a, and the side length of another direction where the partition ends second may be e. Correspondingly, the position coordinates of the two directions where the partition ends first may be all multiplied by e/a to achieve the scaling of the two directions where the partition ends first. According to the above method, the position coordinates can be decoded when the octree and binary trees are mixed.

When only the octree is used, the partition may be completed in the three directions simultaneously, that is, the side lengths in the three directions may reach the minimum side length simultaneously and the scaling may not be necessary.

After decoding the position coordinates, the number of the points of the point cloud corresponding to each position coordinate may be decoded. In a possible implementation, when a 0 is decoded, the current leaf node block may contain only one three-dimensional data point of the point cloud. When a 1 is decoded, the current leaf node block may contain more than one three-dimensional data point of the point cloud, and then the value (n−1) is decoded, indicating that the current leaf node block contains n three-dimensional data points of the point cloud. The position coordinates of the point cloud may be decoded by decoding the position coordinate bitstream sequentially. According to the above-mentioned scheme, the position coordinate code stream encoded by the coding scheme can be decoded.

Figure 9:
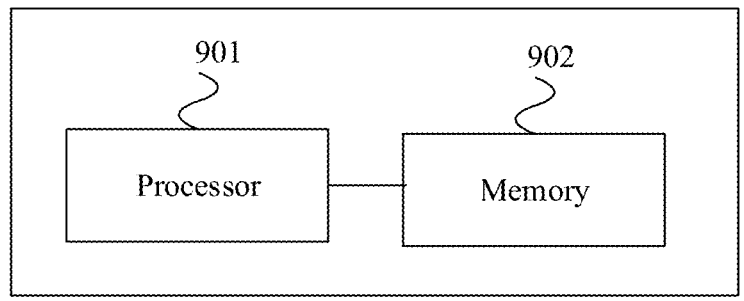
FIG. 9 illustrates an exemplary encoding device of a three-dimensional data point consistent with various embodiments of the present disclosure.

The present disclosure also provides a three-dimensional data point encoding device. IN one embodiment as shown in FIG. 9, the three-dimensional data point encoding device includes a processor 901 and a memory 902.

The processor 901 is configured to determine maximum values of side lengths in three directions of a cuboid of the three-dimensional data points to be encoded.

The processor 901 is further configured to perform at least one octree partition process on the cuboid to obtain a plurality of first-type sub-blocks.

The processor 901 is further configured to perform at least one quadtree partition process and/or binary tree partition process on at one first-type sub-blocks of the plurality of first-type sub-blocks.

The processor 901 is further configured to encode the three-dimensional data points to be encoded according to partition results of the cuboid.

Optionally, the memory 902 may be configured to store code stream obtained by encoding.

Optionally, when the side lengths in the three directions of the cuboid are all different, the processor 901 may be further configured to: perform at least one quadtree partition process on at least one first-type sub-block of the plurality of first-type sub-blocks to obtain second-type sub-blocks, until the side lengths in two directions of the second-type sub-blocks reach the minimum side length; and perform at least one binary tree partition process on at least one second-type sub-block of the second-type sub-blocks to obtain third-type sub-blocks, until the side lengths in the three directions of the third-type sub-blocks reach the minimum side length.

Optionally, when the side lengths in two directions of the cuboid are equal and larger than the side length in another direction, the processor 901 may be further configured to: perform at least one quadtree partition process on at least one first-type sub-block of the plurality of first-type sub-blocks to obtain second-type sub-blocks, until the side lengths in three directions of the second-type sub-blocks reach the minimum side length.

Optionally, when the side lengths in two directions of the cuboid are equal and smaller than the side length in another direction, the processor 901 may be further configured to: perform at least one binary tree partition process on at least one first-type sub-block of the plurality of first-type sub-blocks to obtain a plurality of third-type sub-blocks, until the side lengths in three directions of the plurality of third-type sub-blocks reach the minimum side length.

Optionally, the processor 901 may be configured to: determine first-type target sub-bocks of the plurality of first-type sub-blocks. Optionally, the first-type target sub-blocks may be sub-blocks of the plurality of first-type sub-blocks whose side length in one direction reaches the minimum side length and contains three-dimensional data points. At least one quadtree partition process may be performed on the first-type target sub-blocks. Further, a second-type target sub-block of the second-type sub-blocks may be determined. Optionally, the second-type target sub-block may be one sub-block of the second-type sub-blocks whose side lengths in two direction reaches the minimum side length and contains three-dimensional data points. At least one binary tree partition process may be performed on the second-type target sub-block.

Optionally, the processor 901 may be configured to: determine first-type target sub-bocks of the plurality of first-type sub-blocks. Optionally, the first-type target sub-blocks may be sub-blocks of the plurality of first-type sub-blocks whose side length in one direction reaches the minimum side length and contains three-dimensional data points. At least one quadtree partition process may be performed on the first-type target sub-blocks.

Optionally, the processor 901 may be configured to: determine first-type target sub-bocks of the plurality of first-type sub-blocks. Optionally, the first-type target sub-blocks may be sub-blocks of the plurality of first-type sub-blocks whose side lengths in two directions reach the minimum side length and contains three-dimensional data points. At least one binary tree partition process may be performed on the first-type target sub-blocks.

Optionally, the processor 901 may be configured to encode each partition process according to partition order and the status of the three-dimensional data points contained in sub-blocks obtained by each partition.

Optionally, the processor 901 may be configured to obtain the code stream corresponding to the current partition process according to the status of the three-dimensional data points contained in the sub-blocks obtained in the partition process, and encode the code stream corresponding to each partition process according to the partition order.

Optionally, the processor 901 may be configured to: according to the status of the three-dimensional data points contained in the sub-blocks obtained in the partition process, obtain a bitstream corresponding to each sub-block where each sub-block corresponds to one bit and bit values of the sub-blocks including the three-dimensional data points is different from bit values of the sub-blocks not including the three-dimensional data points; and generate the code stream corresponding to the current partition process according to the bit values corresponding to the sub-blocks. In each partition process, the bit values corresponding to the sub-blocks may be obtained, and the code stream corresponding to the current partition process may be obtained according to the bit values corresponding to the sub-blocks.

Optionally, the code stream corresponding to each partition process may include 8 bits.

The processor 901 may be configured to perform at least one of: when the octree partition is performed, determining bit values of the 8 bits according to the status of the three-dimensional data points contained in the eight sub-blocks obtained in the partition process; when the quadtree partition is performed, determining bit values of 4 bits of the 8 bits according to the status of the three-dimensional data points contained in the four sub-blocks obtained in the partition process, and determining bit values of remaining 4 bits to be same as the bit values of the sub-blocks which do not containing the three-dimensional data points; and when the binary tree partition is performed, determining bit values of 2 bits of the 8 bits according to the status of the three-dimensional data points contained in the two sub-blocks obtained in the partition process, and determining bit values of remaining 6 bits to be same as the bit values of the sub-blocks which do not containing the three-dimensional data points.

Optionally, the processor 901 may be configured to perform at least one of: when the octree partition is performed and the code stream corresponding to each partition process includes 8 bits, determining bit values of the 8 bits according to the status of the three-dimensional data points contained in the eight sub-blocks obtained in the partition process; when the octree partition is performed and the code stream corresponding to each partition process includes 4 bits, determining bit values of the 4 bits according to the status of the three-dimensional data points contained in the four sub-blocks obtained in the partition process; and when the octree partition is performed and the code stream corresponding to each partition process includes 2 bits, determining bit values of the 2 bits according to the status of the three-dimensional data points contained in the two sub-blocks obtained in the partition process.

Optionally, the bit value corresponding to one sub-block containing the three-dimensional data points of the point cloud may be 0, and the bit value corresponding to one sub-block not containing the three-dimensional data points of the point cloud may be 1.

Optionally, the bit value corresponding to one sub-block containing the three-dimensional data points of the point cloud may be 1, and the bit value corresponding to one sub-block not containing the three-dimensional data points of the point cloud may be 0.

Optionally, the processor 901 may be further configured to: when the side lengths in one direction or in two directions in the sub-blocks obtained in the partition reach the minimum side length, encoding a first identifier. The first identifier may be used to indicate a change of the partition mode where the partition mode includes the octree partition, the quadtree partition, or the binary tree partition, such that the decoding end may change the partition mode according to the first identifier.

Optionally, when the side length in one direction of the sub-blocks obtained by the octree partition reaches the minimum side length or the side lengths in two directions of the sub-blocks obtained by the octree partition reach the minimum side length at the same time, the first identifier may have 8 bits, and the bit values of the 8 bits may be consistent with the bit values corresponding to the sub-blocks that do not contain three-dimensional data points.

When the side lengths in two directions of the sub-blocks obtained by the quadtree partition reach the minimum side length, the first identifier may include 4 bits, and the bit values of the 4 bits may be consistent with the bit value corresponding to the sub-blocks that do not contain the three-dimensional data points.

Optionally, the processor 901 may be further configured to: encode a second identifier. The second identifier may be used to indicate the directions where the side lengths reach the minimum side length or the directions where the side lengths do not reach the minimum side length.

Optionally, the second identifier may include 3 bits or 2 bits.

Optionally, the processor 901 may be further configured to: encode a third identifier. The second identifier may be used to indicate the end of the partition.

Optionally, the processor 901 may be further configured to encode the maximum values of the position coordinates of the three-dimensional data point to be coded in the three directions, and write the maximum values in the three directions into the information header.

Optionally, the processor 901 may be further configured to encode a maximum value of the maximum values of the position coordinates of the three-dimensional data point to be coded in the three directions, and write the maximum value of the maximum values in the three directions into the information header.

Optionally, the processor 901 may be further configured to encode a minimum value among the maximum values of the position coordinates of the three-dimensional data point to be coded in the three directions, and write the minimum value of the maximum values in the three directions into the information header.

Optionally, the processor 901 may be further configured to: quantify the position coordinates of the three-dimensional data points to be encoded; obtain the maximum values of the position coordinates of the three-dimensional data points in three directions according to the position coordinates of the three-dimensional data points after quantification; according to the maximum values the position coordinates of the three-dimensional data points in the three directions, determine the maximum values of the side lengths in the three directions of the cuboid of the three-dimensional data point to be encoded.

Optionally, the processor 901 may be further configured to obtain a value that is larger than or equal to the integer power of 2 of the maximum values of the position coordinates of the three-dimensional data points and closest to the maximum values.

Optionally, the processor 901 may be further configured to encode a number of the three-dimensional data points in one sub-block containing the three-dimensional data points.

Optionally, when the sub-block contains 1 three-dimensional data point, it may be encoded as 0, and when the sub-block contains N three-dimensional data points, it may be encoded as 1 and N−1.

The device provided by the present embodiment may be used to perform any three-dimensional data point encoding method provided by various embodiments of the present disclosure shown in FIG. 1 to FIG. 5.

Figure 10:
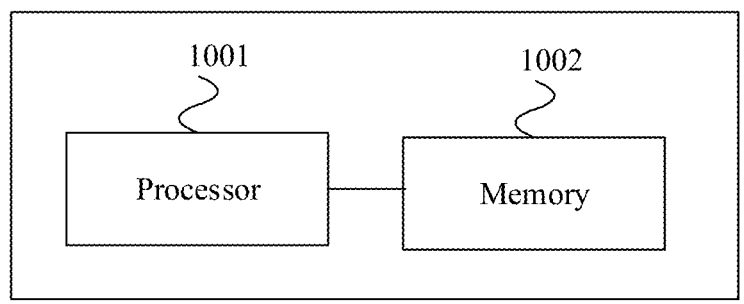
FIG. 10 illustrates an exemplary decoding device of three-dimensional data point consistent with various embodiments of the present disclosure.

The present disclosure also provides a three-dimensional data point decoding device. As shown in FIG. 10, the device includes a processor 1001 and a memory 1002.

The processor 1001 is configured to decoding code stream of the three-dimensional data points to be decoded.

The processor 1001 is further configured to construct a hexahedron according to the decoded code stream and perform at least one octree partition process on the hexahedron to obtain a plurality of first-type sub-blocks.

The processor 1001 is further configured to perform at least one quadtree partition process and/or binary tree partition process on at one first-type sub-blocks of the plurality of first-type sub-blocks.

The processor 1001 is further configured to obtain position coordinates of the three-dimensional data points to be decoded according to the position of the sub-blocks obtained by partition.

Optionally, the memory 1002 may be configured to store code stream obtained by encoding.

Optionally, the hexahedron may be a cuboid.

Optionally, the hexahedron may be a cuboid and when the side lengths in the three directions of the cuboid are all different, the processor 1001 may be further configured to: perform at least one quadtree partition process on at least one first-type sub-block of the plurality of first-type sub-blocks to obtain second-type sub-blocks, until the side lengths in two directions of the second-type sub-blocks reach the minimum side length; and perform at least one binary tree partition process on at least one second-type sub-block of the second-type sub-blocks to obtain third-type sub-blocks, until the side lengths in the three directions of the third-type sub-blocks reach the minimum side length.

Optionally, the hexahedron may be a cuboid and when the side lengths in two directions of the cuboid are equal and larger than the side length in another direction, the processor 1001 may be further configured to: perform at least one quadtree partition process on at least one first-type sub-block of the plurality of first-type sub-blocks to obtain second-type sub-blocks, until the side lengths in three directions of the second-type sub-blocks reach the minimum side length.

Optionally, the hexahedron may be a cuboid and when the side lengths in two directions of the cuboid are equal and smaller than the side length in another direction, the processor 1001 may be further configured to: perform at least one binary tree partition process on at least one first-type sub-block of the plurality of first-type sub-blocks to obtain a plurality of third-type sub-blocks, until the side lengths in three directions of the plurality of third-type sub-blocks reach the minimum side length.

Optionally, the processor 1001 may be configured to: determine first-type target sub-bocks of the plurality of first-type sub-blocks according to the bit values corresponding to the plurality of first-type sub-blocks. The bit values corresponding to one first-type target sub-block may indicate that the sub-block contains three-dimensional data points.

At least one quadtree partition process may be performed on the first-type target sub-blocks.

Further, a second-type target sub-block of the second-type sub-blocks may be determined according to the bit values corresponding to the second-type sub-blocks. The bit values corresponding to the second-type target sub-block may indicate that the sub-block contains three-dimensional data points.

At least one binary tree partition process may be performed on the second-type target sub-block.

Optionally, the processor 1001 may be configured to: determine first-type target sub-bocks of the plurality of first-type sub-blocks according to the bit values corresponding to the plurality of first-type sub-blocks. The bit values corresponding to one first-type target sub-block may indicate that the sub-block contains three-dimensional data points.

At least one quadtree partition process may be performed on the first-type target sub-blocks.

Optionally, the processor 1001 may be configured to: determine first-type target sub-bocks of the plurality of first-type sub-blocks according to the bit values corresponding to the plurality of first-type sub-blocks. The bit values corresponding to one first-type target sub-block may indicate that the sub-block contains three-dimensional data points.

At least one binary tree partition process may be performed on the first-type target sub-blocks.

Optionally, the processor 1001 may be further configured to: decode a first identifier. The first identifier may be used to indicate a change of the partition mode where the partition mode includes the octree partition, the quadtree partition, or the binary tree partition, such that the decoding end may change the partition mode according to the first identifier.

Optionally, the processor 1001 may be further configured to: decode a second identifier. The second identifier may be used to indicate the directions where the side lengths reach the minimum side length or the directions where the side lengths do not reach the minimum side length.

Optionally, the processor 1001 may be further configured to: decode a third identifier. The third identifier may be used to indicate the end of the partition.

Optionally, when the hexahedron is a cubic, the processor 1001 may be configured to determine whether the quadtree partition or the binary tree partition is performed according to the first identifier and the second identifier, and determine the end of the partition according to the third identifier.

Optionally, the processor 1001 may be further configured to decode the maximum values of the position coordinates of the three-dimensional data point to be decoded in the three directions, and construct the cuboid according to the maximum values in the three directions.

Optionally, the processor 1001 may be further configured to: decode a maximum value of the maximum values of the position coordinates of the three-dimensional data points to be decoded in the three directions; construct the cubic according to the maximum value of the maximum values in the three directions; and obtain the position coordinates of three-dimensional data points to be decoded according to the positions of the sub-blocks obtained by partition, the maximum value of the maximum values in the three directions, and the ratio between the side lengths of the sub-blocks obtained finally.

Optionally, the processor 1001 is specifically configured to: obtain the first position coordinates of the three-dimensional data points to be decoded according to the positions of the sub-blocks obtained by the partition; obtain a ratio between the shortest side length of the sub-blocks obtained after the partition to the end, and the side lengths of the other two directions respectively; and make the coordinate value of each coordinate in the other two directions multiplied by the ratio of the corresponding direction.

Optionally, the processor 1001 may be further configured to: decode a minimum value of the maximum values of the position coordinates of the three-dimensional data points to be decoded in the three directions; construct the cubic according to the minimum value of the maximum values in the three directions; and obtain the position coordinates of three-dimensional data points to be decoded according to the positions of the sub-blocks obtained by partition, the minimum value of the maximum values in the three directions, and the ratio between the side lengths of the sub-blocks obtained finally.

Optionally, the processor 1001 is specifically configured to: obtain the first position coordinates of the three-dimensional data points to be decoded according to the positions of the sub-blocks obtained by the partition; obtain a ratio between the longest side length of the sub-blocks obtained after the partition to the end, and the side lengths of the other two directions respectively; and make the coordinate value of each coordinate in the other two directions multiplied by the ratio of the corresponding direction.

The device provided by the present embodiment may be used to perform any three-dimensional data point decoding method provided by various embodiments of the present disclosure shown in FIG. 6.

The present disclosure also provides an encoder. The encoder includes a memory, a processor, and a program stored in the memory and configured to be executed by the processor. When the processor executes the program, any three-dimensional data point encoding method provided by various embodiments of the present disclosure shown in FIG. 1 to FIG. 5 may be achieved.

The present disclosure also provides a decoder. The encoder includes a memory, a processor, and a program stored in the memory and configured to be executed by the processor. When the processor executes the program, any three-dimensional data point encoding method provided by various embodiments of the present disclosure shown in FIG. 6 may be achieved.

In some embodiments, a three-dimensional data point may be any three-dimensional data point in point cloud data obtained by a distance measuring device. The distance measuring device may be an electronic equipment including a laser radar or a laser distance measuring equipment. In one embodiment, the distance measuring device may be used to sense external environmental information, for example, including distance information, orientation information, reflection intensity information, speed information, etc. of environmental targets. A three-dimensional data point may include at least one of the external environment information measured by the distance measuring device.

In one implementation, the distance measuring device can detect the distance from the object to be detected to the distance measuring device by measuring the time of light propagation between the distance measuring device and the probe, that is, the time-of-flight (TOF). Alternatively, the distance measuring device can also detect the distance from the object to be detected to the distance measuring device through other technologies, such as a distance measuring method based on phase shift measurement, or a distance measuring method based on frequency shift measurement. The present disclosure has no limit on this.

Figure 11:
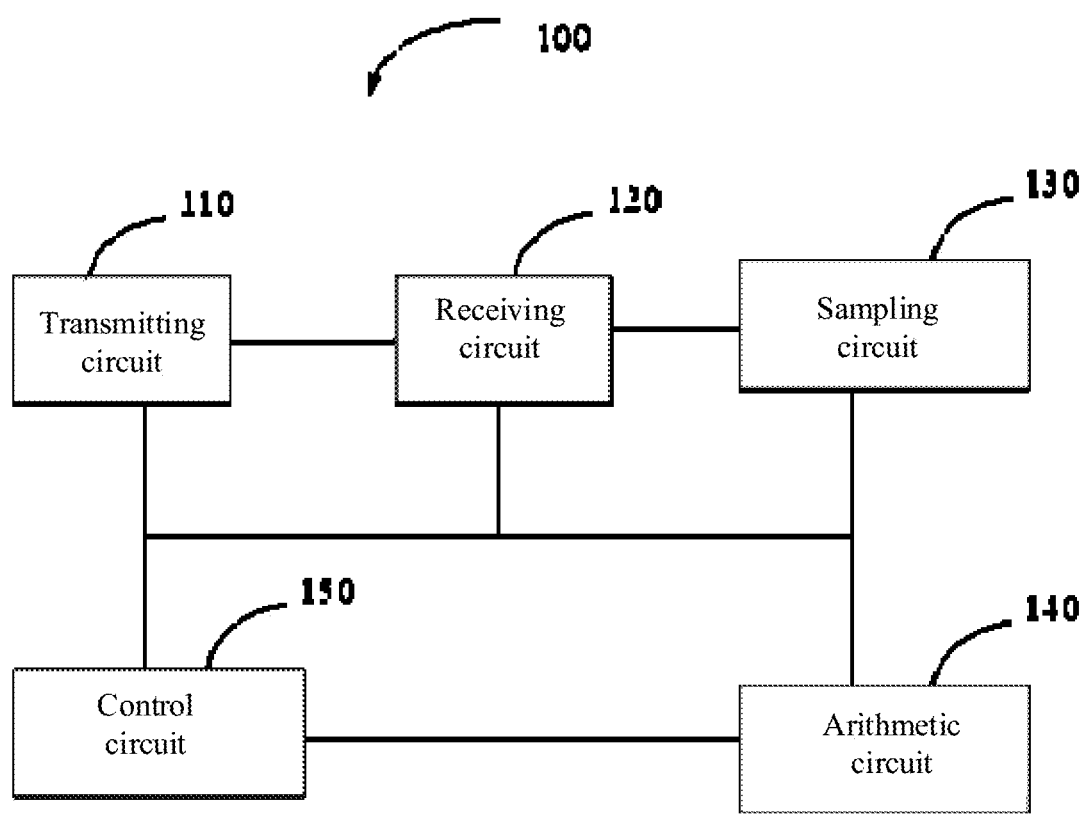
FIG. 11 illustrates an exemplary distance measurement device consistent with various embodiments of the present disclosure.

FIG. 11 illustrates a distance measuring device 100 for obtaining the three-dimensional data points provided by various embodiments of the present disclosure.

As shown in FIG. 11, the distance measuring device 100 includes a transmitting circuit 110, a receiving circuit 120, a sampling circuit 130, and an arithmetic circuit 140.

The transmitting circuit 110 may emit a light pulse sequence (for example, a laser pulse sequence). The receiving circuit 120 may receive the light pulse sequence reflected by the object to be detected, and perform photoelectric conversion on the light pulse sequence to obtain an electrical signal. After processing the electrical signal, the electrical signal may be output to the sampling circuit 130. The sampling circuit 130 may sample the electrical signal to obtain the sampling result. The arithmetic circuit 140 may determine the distance between the distance measuring device 100 and the object to be detected based on the sampling result of the sampling circuit 130.

Optionally, the distance measuring device 100 may further include a control circuit 150 that can control other circuits, for example, can control the working time of each circuit and/or set parameters for each circuit.

For description purpose only, the embodiment in FIG. 11 where the distance measuring device includes a transmitting circuit, a receiving circuit, a sampling circuit, and an arithmetic circuit is used as an example to illustrate the present disclosure, and does not limit the scope of the present disclosure. In some other embodiments, the distance measuring device may include at least two transmitting circuits, at least two receiving circuits, at least two sampling circuits, or at least two arithmetic circuits. It may be used to emit at least two light beams in the same direction or in different directions respectively. The at least two light beams can be emitted at the same time, or can be emitted at different times respectively. In an example, the light-emitting chips in the at least two transmitting circuits may be packaged in the same module. For example, each emitting circuit includes a laser emitting chip, and the dies in the laser emitting chips in the at least two emitting circuits are packaged together and housed in the same packaging space.

In some embodiments, in addition to the circuit shown in FIG. 11, the distance measuring device 100 may further include a scanner 160 for changing the propagation direction of at least one laser pulse sequence emitted by the transmitting circuit.

The module including the transmitting circuit 110, the receiving circuit 120, the sampling circuit 130, and the arithmetic circuit 140, or the module including the transmitting circuit 110, the receiving circuit 120, the sampling circuit 130, the arithmetic circuit 140, and the control circuit 150, may be referred to as a distance measurement module. The distance measurement module may be independent of other modules, for example, the scanner 160.

Figure 12:
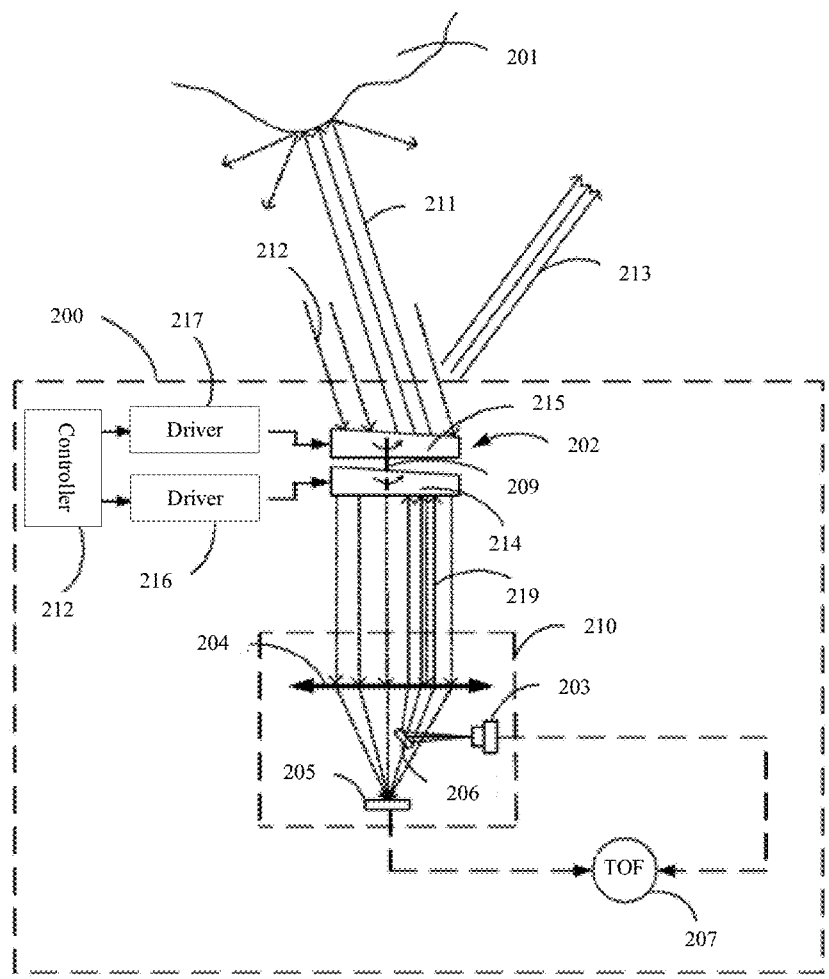
FIG. 12 illustrates a schematic diagram of an exemplary distance measurement device adopting a coaxial optical path consistent with various embodiments of the present disclosure.

A coaxial light path may be used in the distance measuring device, that is, the light beam emitted by the distance measuring device and the reflected light beam may share at least part of the light path in the distance measuring device. For example, after at least one laser pulse sequence emitted by the transmitter circuit changes its propagation direction and exits through the scanner, the laser pulse sequence reflected by the probe may pass through the scanner and then enters the receiving circuit. Alternatively, the distance measuring device may also adopt an off-axis light path, that is, the light beam emitted by the distance measuring device and the reflected light beam may be respectively transmitted along different light paths in the distance measuring device. FIG. 12 illustrates a schematic diagram of an embodiment in which the distance measuring device of the present invention adopts a coaxial light path.

The distance measuring device 200 includes a ranging module 210, and the ranging module 210 includes a transmitter 203 (which may include the above-mentioned transmitting circuit), a collimating element 204, a detector 205 (which may include the above-mentioned receiving circuit, sampling circuit, and arithmetic circuit), and a light path changing element 206. The ranging module 210 is used to emit a light beam, receive the returned light, and convert the returned light into an electrical signal. Among them, the transmitter 203 can be used to emit a light pulse sequence. In one embodiment, the transmitter 203 may emit a sequence of laser pulses. Optionally, the laser beam emitted by the transmitter 203 may be a narrow-bandwidth beam with a wavelength outside the visible light range. The collimating element 204 may be arranged on the exit light path of the transmitter, and used to collimate the light beam emitted from the transmitter 203 into parallel light to be output to the scanner. The collimating element may be also used to condense at least a part of the returned light reflected by the object to be detected. The collimating element 204 may be a collimating lens or other elements capable of collimating light beams.

In the embodiment shown in FIG. 12, the light path changing element 206 may be used to combine the transmitting light path and the receiving light path in the distance measuring device before the collimating element 104, such that the transmitting light path and the receiving light path can share the same collimating element. The light path may be more compact. In some other embodiments, the transmitter 103 and the detector 105 may respectively use their respective collimating elements, and the light path changing element 206 may be arranged on the light path behind the collimating elements.

In the embodiment shown in FIG. 12, since the beam aperture of the light beam emitted by the transmitter 103 is small, and the beam aperture of the returned light received by the distance measuring device is relatively large, the light path changing element can use a small-area mirror to combine the transmitting light path and the receiving light path. In some other embodiments, the light path changing element may also adopt a reflector with a through hole, where the through hole is used to transmit the emitted light of the transmitter 203 and the reflector is used to reflect the returned light to the detector 205. In this way, the shielding of the back light from the support of the small reflector in the case of using the small reflector can be reduced.

In the embodiment shown in FIG. 12, the light path changing element is deviated from the optical axis of the collimating element 204. In some other embodiments, the light path changing element may also be located on the optical axis of the collimating element 204.

The distance measuring device 200 further includes a scanner 202. The scanner 202 may be placed on the exit light path of the ranging module 210, and used to change the transmission direction of the collimated beam 219 emitted by the collimating element 204 and project it to the external environment, and project the returned light to the collimating element 204. The returned light may be collected on the detector 205 via the collimating element 204.

In an embodiment, the scanner 202 may include at least one optical element for changing the propagation path of the light beam, and the optical element may change the propagation path of the light beam by reflecting, refracting, or diffracting the light beam. For example, the scanner 202 may include a lens, a mirror, a prism, a galvanometer, a grating, a liquid crystal, an optical phased array (Optical Phased Array), or any combination thereof. In an example, at least part of the optical element may be moving. For example, the at least part of the optical element may be driven to move by a driving module, and the moving optical element can reflect, refract or diffract the light beam to different directions at different times. In some embodiments, the multiple optical elements of the scanner 202 can rotate or vibrate around a common axis 209, and each rotating or vibrating optical element may be used to continuously change the propagation direction of the incident light beam. In one embodiment, the multiple optical elements of the scanner 202 may rotate at different speeds or vibrate at different speeds. In some other embodiment, at least part of the optical elements of the scanner 202 may rotate at substantially the same rotation speed. In some other embodiments, the multiple optical elements of the scanner may also rotate around different axes. In some embodiments, the multiple optical elements of the scanner may also rotate in the same direction or in different directions; or vibrate in the same direction, or vibrate in different directions, which is not limited herein.

In one embodiment, the scanner 202 may include a first optical element 214 and a driver 216 connected to the first optical element 214. The driver 216 may be used to drive the first optical element 214 to rotate around the rotation axis 209, such that the first optical element 214 changes the direction of the collimated beam 219. The first optical element 214 may project the collimated beam 219 to different directions. In one embodiment, the angle between the direction of the collimated beam 219 changed by the first optical element and the rotation axis 109 may change with the rotation of the first optical element 214. In one embodiment, the first optical element 214 may include a pair of opposing non-parallel surfaces through which the collimated light beam 219 can pass. In another embodiment, the first optical element 214 may include a prism whose thickness varies in at least one radial direction. In another embodiment, the first optical element 114 may include a wedge angle prism to refract the collimated light beam 119.

In an embodiment, the scanner 202 may further include a second optical element 215. The second optical element 215 may rotate around the rotation axis 209, and the rotation speed of the second optical element 215 may be different from the rotation speed of the first optical element 214. The second optical element 215 may be used to change the direction of the light beam projected by the first optical element 214. In one embodiment, the second optical element 115 may be connected to a driver 217, and the driver 117 may drive the second optical element 215 to rotate. The first optical element 214 and the second optical element 215 can be driven by the same or different drivers, and the rotation speed and/or rotation direction of the first optical element 214 and the second optical element 215 may be different. Correspondingly, the collimated light beam 219 may be projected to the outside space in different directions and a larger space can be scanned. In one embodiment, the controller 218 may control the drivers 216 and 217 to drive the first optical element 214 and the second optical element 215, respectively. The rotational speeds of the first optical element 214 and the second optical element 215 may be determined according to the area and pattern to be scanned in actual applications. The drivers 216 and 217 may include motors or other drivers.

In one embodiment, the second optical element 115 may include a pair of opposed non-parallel surfaces through which the light beam can pass. In another embodiment, the second optical element 115 may include a prism whose thickness varies in at least one radial direction. In another embodiment, the second optical element 115 may include a wedge prism.

In one embodiment, the scanner 102 may further include a third optical element (not shown) and a driver for driving the third optical element to move. Optionally, the third optical element may include a pair of opposite non-parallel surfaces, and the light beam can pass through the pair of surfaces. In another embodiment, the third optical element may include a prism whose thickness varies in at least one radial direction. In another embodiment, the third optical element includes a wedge prism. At least two of the first, second, and third optical elements may rotate at different rotation speeds and/or rotation directions.

Figure 13:
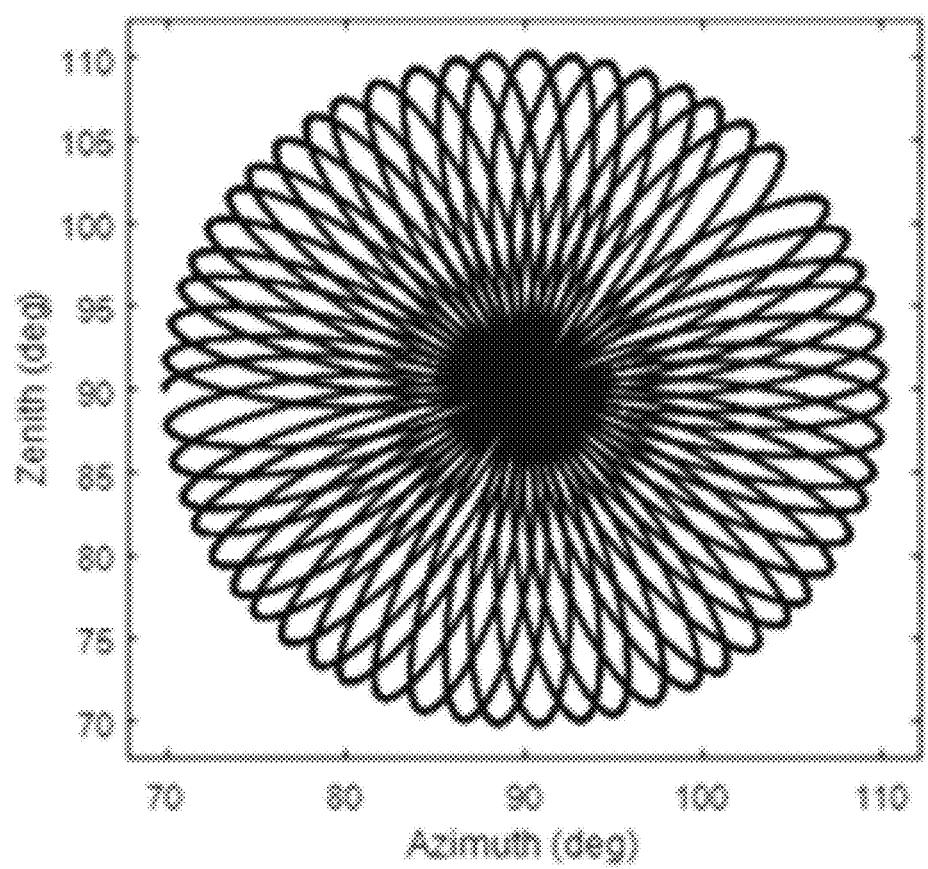
FIG. 13 illustrates a scanning pattern of a distance measurement device consistent with various embodiments of the present disclosure.

The rotation of each optical element in the scanner 202 can project light to different directions, such as directions 211 and 213, such that the space around the distance measuring device 200 can be scanned. FIG. 13 is a schematic diagram of a scanning pattern of the distance measuring device 200. It is understandable that when the speed of the optical elements in the scanner changes, the scanning pattern will also change.

When the light at direction 213 projected by the scanner 202 hits the object 201 to be detected, a part of the light may be reflected by the object 201 to be detected to the distance measuring device 200 in a direction opposite to the projected light 213. The returned light at direction 212 reflected by the object 201 to be detected may be incident on the collimating element 204 after passing through the scanner 202.

The detector 205 and the transmitter 203 may be placed on the same side of the collimating element 204, and the detector 205 may be used to convert at least part of the returned light passing through the collimating element 204 into electrical signals.

In one embodiment, an anti-reflection coating may be plated on each optical element. Optionally, the thickness of the antireflection coating may be equal to or close to the wavelength of the light beam emitted by the transmitter 103, to increase the intensity of the transmitted light beam.

In one embodiment, a filter layer may be plated on the surface of an element located on the beam propagation path in the distance measuring device, or a filter may be provided on the beam propagation path, for transmitting at least the wavelength band of the beam emitted by the transmitter and reflecting other bands to reduce the noise caused by ambient light to the receiver.

In some embodiments, the transmitter 203 may include a laser diode through which nanosecond laser pulses are emitted. Further, the laser pulse receiving time can be determined, for example, the laser pulse receiving time can be determined by detecting the rising edge time and/or the falling edge time of the electrical signal pulse. In this way, the distance measuring device 200 can calculate the TOF using the pulse receiving time information and the pulse sending time information, to determine the distance between the object 201 to be detected and the distance measuring device 200.

The distance and orientation detected by the distance measuring device 200 can be used for remote sensing, obstacle avoidance, surveying and mapping, modeling, navigation, and the like. In one embodiment, the distance measuring device of the embodiment of the present invention can be applied to a mobile platform, and the distance measuring device can be installed on the platform body of the mobile platform. A mobile platform with a distance measuring device can measure the external environment, for example, measuring the distance between the mobile platform and obstacles for obstacle avoidance and other purposes, and for two-dimensional or three-dimensional surveying and mapping of the external environment. In some embodiments, the mobile platform may include at least one of an unmanned aerial vehicle, a car, a remote control car, a robot, or a camera. When the distance measuring device is applied to an unmanned aerial vehicle, the platform body may be the fuselage of the unmanned aerial vehicle. When the distance measuring device is applied to a car, the platform body may be the body of the car. The car can be a self-driving car or a semi-autonomous car, and there is no restriction here. When the distance measuring device is applied to a remote control car, the platform body may be the body of the remote control car. When the distance measuring device is applied to a robot, the platform body may be the robot. When the distance measuring device is applied to a camera, the platform body may be the camera itself.

The above embodiments are only used to illustrate the technical solutions of the present disclosure, not to limit them. Other embodiments of the disclosure will be apparent to those skilled in the art from consideration of the specification and practice of the embodiments disclosed herein. It is intended that the specification and examples be considered as examples only and not to limit the scope of the disclosure, with a true scope and spirit of the invention being indicated by the following claims.

What is claimed is:

1. A three-dimensional data point encoding method, comprising:
   determining side lengths of a cuboid of three-dimensional data points to be encoded in three directions, according to position coordinates of the three-dimensional data points to be encoded;
   performing at least two of an octree partition process, a quadtree partition process, or a binary tree partition process on the cuboid, including:
   performing at least one octree partition process on the cuboid to obtain a plurality of first-type sub-blocks;
   in response to the side lengths in the three directions of the cuboid being all different:
      performing at least one quadtree partition process on at least one first-type sub-block of the plurality of first-type sub-blocks to obtain a plurality of second-type sub-blocks, until side lengths in two directions of the plurality of second-type sub-blocks reach a minimum side length; and
      performing at least one binary tree partition process on at least one second-type sub-block of the plurality of second-type sub-blocks to obtain a plurality of third-type sub-blocks, until side lengths in the three directions of the plurality of third-type sub-blocks reach the minimum side length;
   in response to the side length in a first direction of the three directions of the cuboid being equal to the side length in a second direction of the three directions of the cuboid and being larger than the side length in a third direction of the three directions of the cuboid:
      performing at least one quadtree partition process on the at least one first-type sub-block of the plurality of first-type sub-blocks to obtain the plurality of second-type sub-blocks, until side lengths in three directions of the plurality of second-type sub-blocks reach the minimum side length; and
   in response to the side length in the first direction of the three directions of the cuboid being equal to the side length in the second direction of the three directions of the cuboid and being smaller than the side length in the third direction of the three directions of the cuboid:
      performing at least one binary tree partition process on the at least one first-type sub-block of the plurality of first-type sub-blocks to obtain the plurality of third-type sub-blocks, until side lengths in three directions of the plurality of third-type sub-blocks reach the minimum side length; and
   encoding the three-dimensional data points to be encoded according to partition results of the cuboid.

2. The method according to claim 1, wherein encoding the three-dimensional data points to be encoded according to the partition results of the cuboid includes:
   encoding a status of each partition process sequentially, according to a partition order and a status of the three-dimensional data points contained in sub-blocks obtained in each partition process.

3. The method according to claim 2, wherein encoding the status of each partition process according to the partition order and the status of the three-dimensional data points contained in sub-blocks obtained in each partition process includes:
   obtaining a code stream corresponding to each partition process according to the status of the three-dimensional data points contained in sub-blocks obtained in each partition process; and
   encoding the code stream corresponding to each partition process sequentially according to the partition order.

4. The method according to claim 3, wherein obtaining the code stream corresponding to each partition process according to the status of the three-dimensional data points contained in sub-blocks obtained in each partition process includes:

according to the status of the three-dimensional data points contained in the sub-blocks obtained in each partition process, obtaining a bitstream corresponding to each sub-block, wherein each sub-block corresponds to one bit and bit values of the sub-blocks containing the three-dimensional data points are different from bit values of the sub-blocks not containing the three-dimensional data points; and generating the code stream corresponding to each partition process according to the bit values corresponding to the sub-blocks.

5. The method according to claim 4, wherein:

the code stream corresponding to each partition process includes 8 bits; and generating the code stream corresponding to each partition process according to the bit values corresponding to the sub-blocks includes at least one of:

in response to the octree partition process being performed, determining bit values of the 8 bits according to the status of the three-dimensional data points contained in the eight sub-blocks obtained in the partition process;

in response to the quadtree partition process being performed, determining bit values of 4 bits of the 8bits according to the status of the three-dimensional data points contained in the four sub-blocks obtained in the partition process, and determining bit values of remaining 4 bits to be same as the bit values of the sub-blocks which do not contain the three-dimensional data points; and in response to the binary tree partition process being performed, determining bit values of 2 bits of the 8bits according to the status of the three-dimensional data points contained in the two sub-blocks obtained in the partition process, and determining bit values of remaining 6 bits to be same as the bit values of the sub-blocks which do not contain the three-dimensional data points.

6. The method according to claim 4, wherein generating the code stream corresponding to each partition process according to the bit values corresponding to the sub-blocks includes at least one of:

in response to the octree partition process being performed and the code stream corresponding to each partition process being 8 bits, determining bit values of the 8 bits according to the status of the three-dimensional data points contained in the eight sub-blocks obtained in the partition process;

in response to the quadtree partition process being performed and the code stream corresponding to each partition process being 4 bits, determining bit values of the 4 bits according to the status of the three-dimensional data points contained in the four sub-blocks obtained in the partition process; and in response to the binary tree partition process being performed and the code stream corresponding to each partition process being 2 bits, determining bit values of the 2 bits according to the status of the three-dimensional data points contained in the two sub-blocks obtained in the partition process.

7. The method according to claim 4, wherein: the bit value corresponding to one sub-block containing the three-dimensional data points of the point cloud is 0 and the bit value corresponding to one sub-block not containing the three-dimensional data points of the point cloud is 1; or the bit value corresponding to one sub-block containing the three-dimensional data points of the point cloud is 1 and the bit value corresponding to one sub-block not containing the three-dimensional data points of the point cloud is 0.

8. The method according to claim 6, further comprising: in response to the side lengths in one direction or in two directions of the sub-blocks obtained in the partition reaching the minimum side length, encoding a first identifier, wherein the first identifier is used to indicate a change of the partition process and the partition process includes the octree partition process, the quadtree partition process, or the binary tree partition process.

9. The method according to claim 6, wherein:

in response to the side length in one direction of the sub-blocks obtained by the octree partition process reaching the minimum side length or the side lengths in two directions of the sub-blocks obtained by the octree partition process reaching the minimum side length at the same time, the first identifier includes 8 bits, and the bit values of the 8 bits are consistent with the bit values corresponding to the sub-blocks that do not contain three-dimensional data points; and/or in response to the side lengths in two directions of the sub-blocks obtained by the quadtree partition process reaching the minimum side length, the first identifier includes 4 bits, and the bit values of the 4 bits are consistent with the bit value corresponding to the sub-blocks that do not contain the three-dimensional data points.

10. The method according to claim 8, after encoding the first identifier, further comprising: encoding a second identifier, wherein the second identifier is used to indicate the directions where the side lengths reach the minimum side length or the directions where the side lengths do not reach the minimum side length.

11. A three-dimensional data point decoding method, comprising:

decoding code stream of the three-dimensional data points to be decoded;

constructing a hexahedron according to the decoded code stream and performing at least two of an octree partition process, a quadtree partition process, or a binary tree partition process on the hexahedron, performing the at least two of the octree partition process, the quadtree partition process, or the binary tree partition process on the hexahedron including:

performing the octree partition process on the hexahedron to obtain a plurality of first-type sub-blocks; and in response to the hexahedron being a cuboid and side lengths in three directions of the cuboid being all different:

performing at least one quadtree partition process on the at least one first-type sub-block of the plurality of first-type sub-blocks to obtain a plurality of second-type sub-blocks, until side lengths in two directions of the plurality of second-type sub-blocks reach a minimum side length; and performing at least one binary tree partition process on at least one second-type sub-block of the plurality of second-type sub-blocks to obtain a plurality of third-type sub-blocks, until side lengths in the three directions of the plurality of third-type sub-blocks reach the minimum side length;

in response to the hexahedron being the cuboid and the side length in a first direction of the three directions of the cuboid being equal to the side length in a second direction of the three directions of the cuboid and being larger than the side length in a third direction of the three directions of the cuboid:
  performing at least one quadtree partition process on the at least one first-type sub-block of the plurality of first-type sub-blocks to obtain the plurality of second-type sub-blocks, until side lengths in three directions of the plurality of second-type sub-blocks reach the minimum side length; and
in response to the hexahedron being the cuboid and the side length in the first direction of the three directions of the cuboid being equal to the side length in the second direction of the three directions of the cuboid and being smaller than the side length in the third direction of the three directions of the cuboid:
  performing at least one binary tree partition process on the at least one first-type sub-block of the plurality of first-type sub-blocks to obtain the plurality of third-type sub-blocks, until side lengths in three directions of the plurality of third-type sub-blocks reach the minimum side length; and
obtaining position coordinates of the three-dimensional data points to be decoded according to the positions of sub-blocks obtained by partition.

12. The method according to claim 11, further comprising:
decoding a first identifier, wherein the first identifier is used to indicate a change of the partition process and the partition process includes the octree partition process, the quadtree partition process, or the binary tree partition process; and
changing the partition mode according to the first identifier.

13. The method according to claim 12, further comprising:
decoding a second identifier, wherein the second identifier is used to indicate directions where the side lengths reach the minimum side length or directions where the side lengths do not reach the minimum side length; and
determining directions where the side lengths reach the minimum side length or directions where the side lengths do not reach the minimum side length according to the second identifier.

14. The method according to claim 13, further comprising:
decoding a third identifier, wherein the third identifier is used to indicate end of the partition.

15. The method to claim 14, further comprising:
determining whether the quadtree partition process or the binary tree partition process is to be performed according to the first identifier and the second identifier, and determining the end of the partition according to the third identifier.

16. The method according to claim 11, wherein constructing the hexahedron according to the decoded code stream includes:
decoding maximum values of the position coordinates of the three-dimensional data points to be decoded in three directions; and
constructing the cuboid according to the maximum values in the three directions.

17. The method according to claim 11, wherein:
constructing the hexahedron according to the decoded code stream includes: decoding a maximum value of maximum values of the position coordinates of the three-dimensional data points to be decoded in the three directions; and constructing a cubic according to the maximum value of the maximum values in the three directions; and
obtaining the position coordinates of the three-dimensional data points to be decoded according to the positions of the sub-blocks obtained by partition includes: obtaining the position coordinates of the three-dimensional data points to be decoded according to the positions of the sub-blocks obtained by partition, the maximum value of the maximum values in the three directions, and ratios between side lengths of the sub-blocks obtained finally.

18. The method according to claim 17, wherein obtaining the position coordinates of the three-dimensional data points to be decoded according to the positions of the sub-blocks obtained by partition, the maximum value of the maximum values in the three directions, and the ratios between the side lengths of the sub-blocks obtained finally includes:
obtaining first position coordinates of the three-dimensional data points to be decoded according to the positions of the sub-blocks obtained by the partition;
obtaining ratios between a shortest side length of the sub-blocks obtained by the partition to the end, and side lengths of the other two directions respectively; and
making the coordinate value of each coordinate in the other two directions multiplied by the ratio of the corresponding direction.

19. The method according to claim 11, wherein:
constructing the hexahedron according to the decoded code stream includes: decoding a minimum value of maximum values of the position coordinates of the three-dimensional data points to be decoded in the three directions; and constructing a cubic according to the minimum value of the maximum values in the three directions; and
obtaining the position coordinates of the three-dimensional data points to be decoded according to the positions of the sub-blocks obtained by partition includes: obtaining the position coordinates of the three-dimensional data points to be decoded according to the positions of the sub-blocks obtained by partition, the minimum value of the maximum values in the three directions, and ratios between side lengths of the sub-blocks obtained finally.

20. The method according to claim 19, wherein obtaining the position coordinates of the three-dimensional data points to be decoded according to the positions of the sub-blocks obtained by partition, the minimum value of the maximum values in the three directions, and the ratios between the side lengths of the sub-blocks obtained finally includes:
obtaining first position coordinates of the three-dimensional data points to be decoded according to the positions of the sub-blocks obtained by the partition;
obtaining ratios between a longest side length of the sub-blocks obtained by the partition to the end, and the side lengths of the other two directions respectively; and
making the coordinate value of each coordinate in the other two directions multiplied by the ratio of the corresponding direction.

21. A three-dimensional data point encoding device, comprising a processor and a memory, wherein:
the processor is configured to:
  determine side lengths in three directions of a cuboid of three-dimensional data points to be encoded, according to position coordinates of the three-dimensional data points to be encoded;

perform at least one octree partition process on the cuboid to obtain a plurality of first-type sub-blocks;

in response to the side lengths in the three directions of the cuboid being all different:

perform at least one quadtree partition process on at least one first-type sub-block of the plurality of first-type sub-blocks to obtain a plurality of second-type sub-blocks, until side lengths in two directions of the plurality of second-type sub-blocks reach a minimum side length; and perform at least one binary tree partition process on at least one second-type sub-block of the plurality of second-type sub-blocks to obtain a plurality of third-type sub-blocks, until side lengths in the three directions of the plurality of third-type sub-blocks reach the minimum side length;

in response to the side length in a first direction of the three directions of the cuboid being equal to the side length in a second direction of the three directions of the cuboid and being larger than the side length in a third direction of the three directions of the cuboid:

perform at least one quadtree partition process on the at least one first-type sub-block of the plurality of first-type sub-blocks to obtain the plurality of second-type sub-blocks, until side lengths in three directions of the plurality of second-type sub-blocks reach the minimum side length; and in response to the side length in the first direction of the three directions of the cuboid being equal to the side length in the second direction of the three directions of the cuboid and being smaller than the side length in the third direction of the three directions of the cuboid:

perform at least one binary tree partition process on the at least one first-type sub-block of the plurality of first-type sub-blocks to obtain the plurality of third-type sub-blocks, until side lengths in three directions of the plurality of third-type sub-blocks reach the minimum side length; and encode the three-dimensional data points to be encoded according to partition results of the cuboid, and the memory is configured to store code stream obtained by encoding.

* * * * *